United States Patent
Acatrinei

(10) Patent No.: US 7,391,630 B2
(45) Date of Patent: Jun. 24, 2008

(54) METHOD AND SYSTEM FOR POWER FACTOR CORRECTION USING CONSTANT PULSE PROPORTIONAL CURRENT

(75) Inventor: Benjamin Acatrinei, Sunnyvale, CA (US)

(73) Assignee: PF1, Inc., Santa Clara, CA (US)

( * ) Notice: Subject to any disclaimer, the term of this patent is extended or adjusted under 35 U.S.C. 154(b) by 157 days.

(21) Appl. No.: 10/973,748

(22) Filed: Oct. 25, 2004

(65) Prior Publication Data

US 2005/0212501 A1    Sep. 29, 2005

(51) Int. Cl.
*H02M 7/217*    (2006.01)
(52) U.S. Cl. .................................................. 363/89
(58) Field of Classification Search ............. 363/89
See application file for complete search history.

(56) References Cited

U.S. PATENT DOCUMENTS

| | | | |
|---|---|---|---|
| 4,719,552 A | | 1/1988 | Albach et al. |
| 4,940,929 A | * | 7/1990 | Williams ................... 323/222 |
| 4,982,148 A | * | 1/1991 | Engelmann ................ 323/207 |
| 5,003,454 A | * | 3/1991 | Bruning ...................... 363/81 |
| 5,134,355 A | | 7/1992 | Hastings |
| 5,181,159 A | | 1/1993 | Peterson et al. |
| 5,283,727 A | | 2/1994 | Kheraluwala et al. |
| 5,359,276 A | | 10/1994 | Mammano |
| 5,359,277 A | | 10/1994 | Cowett |
| 5,406,192 A | | 4/1995 | Vinciarelli |
| 5,414,613 A | * | 5/1995 | Chen ........................... 363/52 |
| 5,426,579 A | | 6/1995 | Paul et al. |
| 5,442,539 A | * | 8/1995 | Cuk et al. ..................... 363/89 |
| 5,568,041 A | | 10/1996 | Hesterman |
| 5,592,128 A | | 1/1997 | Hwang |
| 5,644,214 A | | 7/1997 | Lee |
| 5,661,645 A | * | 8/1997 | Hochstein .................... 363/89 |
| 5,742,151 A | | 4/1998 | Hwang |
| 5,757,166 A | | 5/1998 | Sodhi |
| 5,804,950 A | | 9/1998 | Hwang et al. |
| 5,815,386 A | | 9/1998 | Gordon |
| 5,847,944 A | | 12/1998 | Jang et al. .................... 363/44 |

(Continued)

OTHER PUBLICATIONS

Abramovitz, et al., "A Resonant Power Factor Conditioner", *IEEE Power Electronics Specialists Conference*, (1993), pp. 995-1001.

(Continued)

*Primary Examiner*—Jeffrey L Sterrett
(74) *Attorney, Agent, or Firm*—Allston L Jones

(57) ABSTRACT

A Power Factor Correction (PFC) system providing near unity power factor for an AC power source (VAC) connected to a complex load. The system includes a bridge rectifier, boost or buck-boost converter, complex load, and pulse width modulation (PWM) controller to provide pulses with variable duty cycle to a power switch. The invention is a constant pulse proportional current (CPPC) PWM controller that generates trains of pulses constant in frequency and duty cycle for one semi-cycle of the VAC. The duty cycle of the driving signal is modified by applying open-loop correction signals to summing nodes of PWM circuits. Since the PWM provides a constant train of driving pulses with constant duty cycle for one semi-cycle of the VAC, the current absorbed by the converter is contingent and linearly proportional to the voltage. Thus, the output current follows the voltage resulting in a power factor of near unity.

26 Claims, 17 Drawing Sheets

U.S. PATENT DOCUMENTS

| | | | |
|---|---|---|---|
| 5,867,374 | A | 2/1999 | Moreau |
| 5,910,891 | A | 6/1999 | Jo |
| 5,912,549 | A | 6/1999 | Farrington et al. |
| 6,049,473 | A * | 4/2000 | Jang et al. ............ 363/89 |
| 6,344,986 | B1 * | 2/2002 | Jain et al. ............. 363/89 |
| 6,469,917 | B1 * | 10/2002 | Ben-Yaakov ........... 363/44 |
| 6,545,887 | B2 * | 4/2003 | Smedley et al. ........ 363/89 |
| 6,757,185 | B2 * | 6/2004 | Rojas Romero ........ 363/89 |
| 2003/0128563 | A1 * | 7/2003 | Rojas Romero ........ 363/89 |
| 2006/0198172 | A1 * | 9/2006 | Wood ................... 363/89 |

OTHER PUBLICATIONS

Chen, W., "An Improved "Charge Pump" Electronic Ballast With Low THD and Low Crest Factor", *IEEE Transactions on Power Electornics*, 12:5, (Sep. 1997), pp. 867-875.

Cho, J.G., et al., "Novel Zero-Voltage Transition Isolated PWM Boost Converter for Single Stage Powre Factor Correction", *IEEE* (1998). pp. 1023-1029.

Goren, J., et al., "Single-Stage Series Resonant Power Factor Correctors", *IEEE*, (1996), pp. 242-247.

Hui, WYR, et al., "A Fully Soft-Switched Extended-Period Quasi-Resonant Power-Factor Correction Circuit", *IEEE*, (1997), pp. 922-930.

Lui, R, et al., "A Unified Approach to the Design of Resonant Power Factor Correction Circuits", *IEEE*, (1992), pp. 181-188.

Jang, Y., et al., "New Single-Switch Three-Phase High-Power-Factor Rectifiers Using Multiresonant Zero-Current Switching", *IEEE Transactions on Power Electronics*, 13:1, (Jan. 1998), pp. 194-201.

Murali, VS, et al., "Comparison of Small-Signal Dynamics of BIFRED and Single-Stage Cascaded Boost-and-Flyback PFC Converters", *IEEE* (1998), pp. 1111-1117.

Pietkiewicz, A., et al., "Single-Stage Power-Factor-Corrected Rectifier Topology", *IEEE*, (1999), (6 pages unnumbered).

Pinheiro, H., et al., "Self-Oscillating Resonant AC/DC Converter Topology for Input Power-Factor Correction", *IEEE Transactions on Industrial Electronics*; 46:4, (Aug. 1999), pp. 692-702.

Qian, J., et al., "Analysis, Design and Experiments of a High-Power-Factor Electronic Ballast", *IEEE Transactions on Industry Applications*, 34:3, (May/Jun. 1998), pp. 616-624.

Qian, J., et al., "Analysis and Pspice Simulation of Family of Resonant Power Factor Correction Circuits", *Electrical and Computer Engineering Department, Univ. of Central Florida*, (undated) pp. 560-566.

Qian, J., et al., "New Charge Pump Power-Factor-Correction Electronic Ballast with a Wide Range of Line Input Voltage", *IEEE Transactions on Power Electronics*, 14:1, (Jan. 1999), pp. 193-201.

Qian, J., et al., "A Single-Stage Electronic Ballast with Power Factor Correction with Low Crest Factor for Fluorescent Lamps", *IEEE Industry Application Society Annual Meeting*, (New Orleans, LA, Oct. 5-9, 1997), pp. 2307-2312.

Qian, J., et al., "Current Source Charge Pump Power Factor Correction Electronic Ballast", *IEEE*, (1997), pp. 66-72.

Sebastian, J., et al., "Voltage-Follower Control in Zero-Current-Switched Quasi-Resonant Power Factor Preregulators", *IEEE Transactions on Power Electronics*, 13:4, (Jul. 1998), pp. 727-738.

Tse, CK, et al., "New Single-Stage Power-Factor-Corrected Regulators Operating in Discontinuous Capacitor Voltage Mode", *IEEE*, (1997), pp. 371-377).

Yang, Z., et al., "Recent Developments in High Power Factor Switch-mode Converters", *IEEE*, (1998), pp. 477-480.

Cheng, R., et al., "A Quasi-Resonant Power Factor Correction Converter", *IEEE Inernational Symposium on Circuits and Systems*, (Hong Kong, Jun. 9-12, 1997), pp. 933-936.

Chang, Y., et al., "Analysis and Control of a Novel Soft-Switched Isolated Boost Converter", *Int. J. Electronics*, (1998) 85:1, pp. 103-119.

Liu, R., et al., "Resonant Power Factor Correction Circuits with Resonant Capacitor-voltage and Inductor-Current-Programmed Controls," *IEEE*, (1993), pp. 675-680.

Liu, R., et al., "Design of High Frequency Resonant Power Factor Correction circuits via Input Current Programmed Control Schemes", *IEEE*, 1992, pp. 245-248.

"Applications: Power Factor Controller", *Electronics World, Wireless World*, vol. 99, No. 1693, pp. 1034-1035, 1993.

Zheren, L., et al., "Time Quantity One-Cycle Control for Power Factor Correctors", *IEEE*, 1996, pp. 821-827.

* cited by examiner

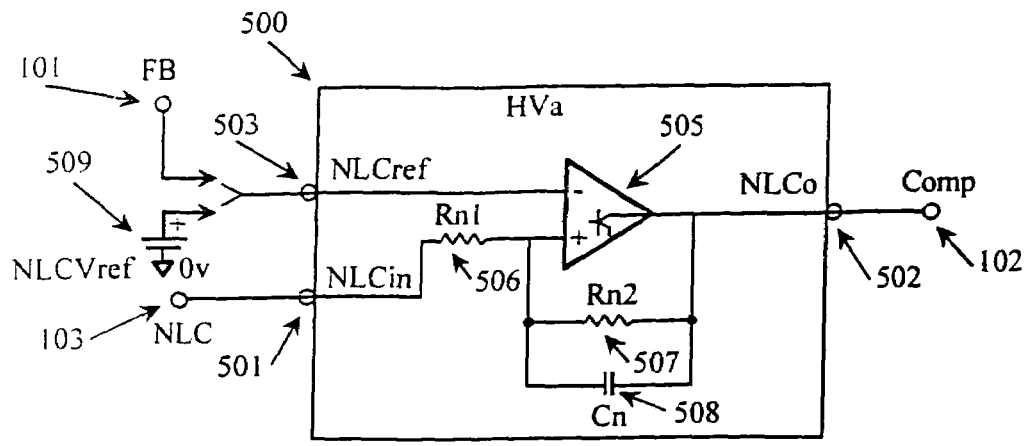
*Fig. 8A - The 2nd NLC Embodiment*
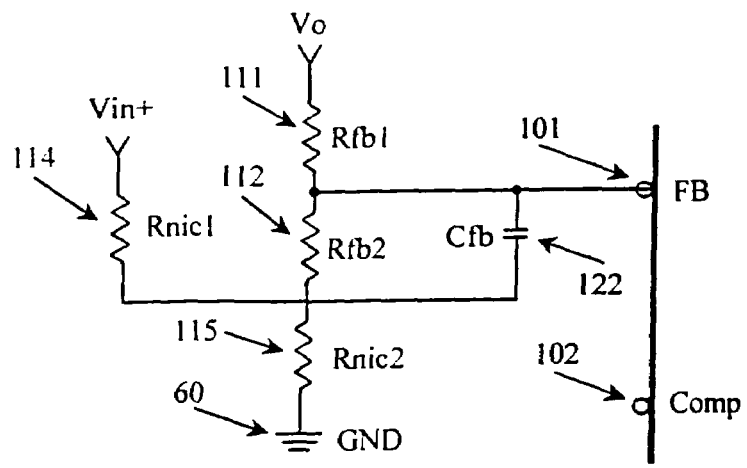
*Fig. 8B - The 3rd NLC Embodiment*
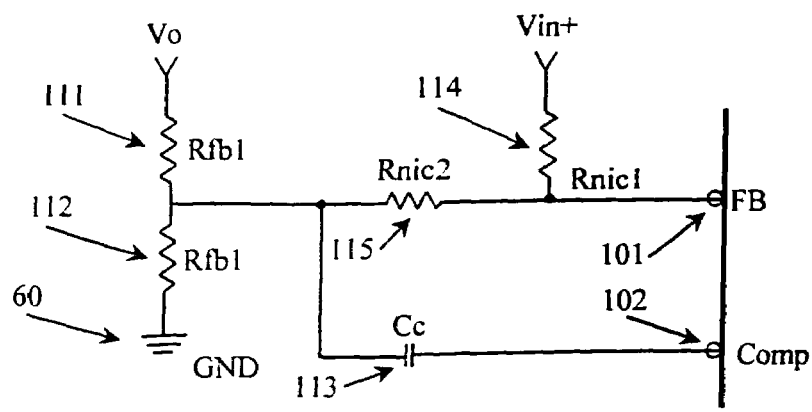
*Fig. 8C - The 4th NLC Embodiment*

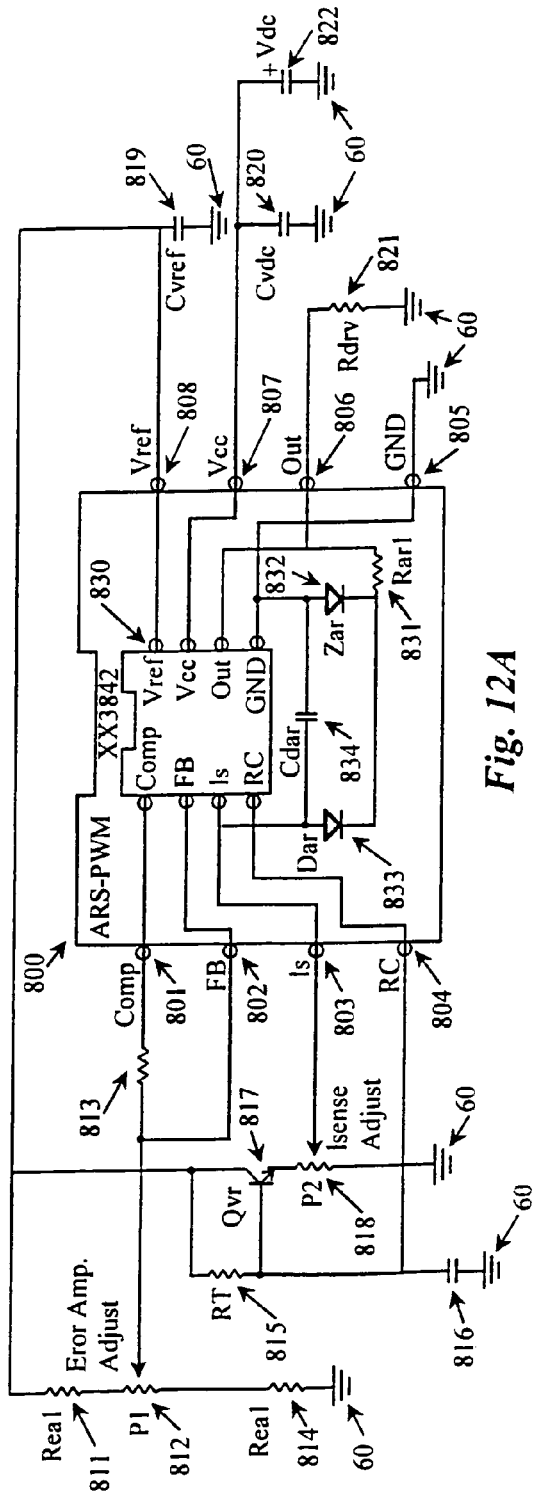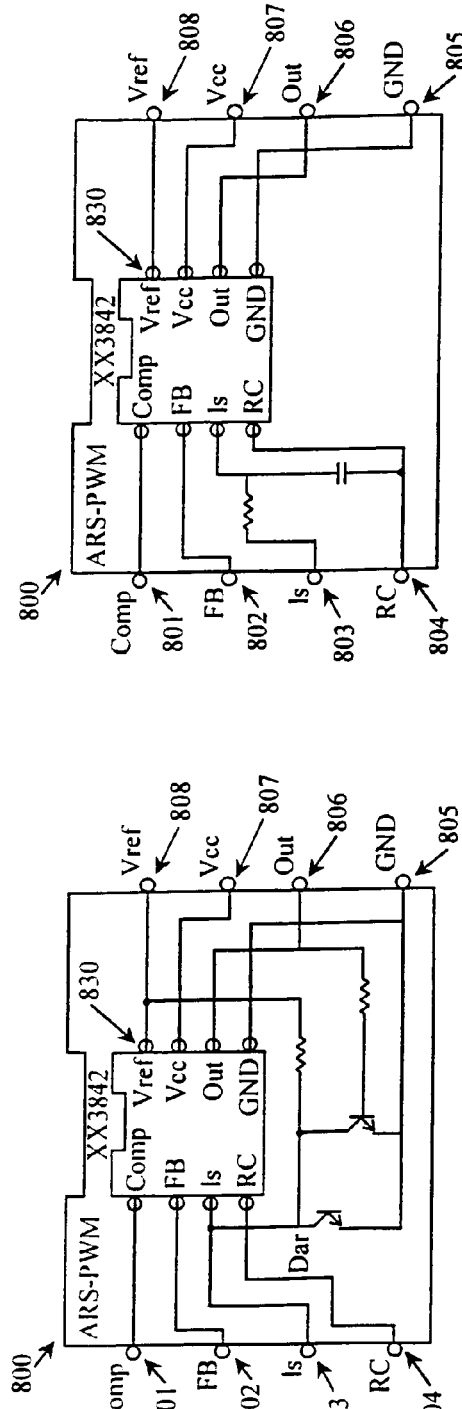
Fig. 12A
Fig. 12B
Fig. 12C

METHOD AND SYSTEM FOR POWER FACTOR CORRECTION USING CONSTANT PULSE PROPORTIONAL CURRENT

BACKGROUND OF THE INVENTION

1. Field of the Invention

The present invention relates to a Power Factor Correction (PFC) Circuit. More particularly, the present invention relates to a new way of managing and controlling an Active PFC System, not by using a classic "Multiplier" concept and its related circuit, but by using an original "Constant Pulse—Proportional Current" (CPPC) conversion concept, embedded via several electronic circuits that have a novel configuration and/or architecture.

Introduction

In the process of transferring AC electrical power from a generator to a load via different converting devices, in addition to the Efficiency, the Power Factor is also a very important parameter.

The Efficiency parameter (Eff=Pout/Pin) provides information about the percentage of the inputted electrical power that has been transferred, by a specific electrical device, to its output load. Usually, the rest of the electrical power, which has not been delivered to the load, is transformed into heat, dissipated by the electrical device's parts.

The Power Factor parameter is not related at all to an electrical device's in/out transfer of the electrical energy (i.e. its efficiency), however it provides information about how well it has managed the "Real Power" absorbed by an electrical device, versus the "Apparent Power" requested by that device from its electrical generator.

The Real Power, defined by the following relation:

$$P(\text{Watts})=[1:T \times \int (Vi \times Ii, dt)]$$

is the watts power absorbed by a device from its electrical generator and its value is proportional to the integral of the voltage and current product/time unit.

The Apparent Power (or RMS Power), defined by the following relation:

$$P(VA)=Vrms \times Irms$$

is the Volt-Amperes power requested by a device from its electrical generator and its amount's value is proportional to the product of the rms Voltage and the rms Current.

Accordingly, the Power Factor (PF) parameter is defined by the following relation:

$$PF=[1:T \times \int (Vi \times Ii, dt)]:(Vrms \times Irms); W/VA<1$$

respectively, the Real Power to the Apparent Power (W/VA) ratio.

2. The Related Art

Passive PFC Solutions

The simplest methods to increase PF and lower Total Harmonic Distortion (THD) are the ones using passive components (inductors and capacitors). Usually, the performances of these kinds of "Passive PFC Solutions" are relatively low, just near the "acceptable" limits of the industry standards.

Active PFC Solutions

Better methods of increasing the PF and lowering the THD in a power supply circuit are the ones comprising so called "Active PFC Systems" that include typically an oscillating coil activated by a power MOSFET transistor (inverter circuit), which is controlled by a PFC Controller Circuit.

The PFC Controller Circuit is basically a classic Pulse Width Modulator (PWM) circuit which includes typically, a "Multiplier" and some other multiplier related sub-circuits, necessarily for forcing the power supply's input current shape to follow the input voltage shape (i.e. a sine wave).

Pulse Width Modulation Circuits

FIG. 1A illustrates a Classic PWM Controller (UC384x series) Circuit's Open Loop Laboratory Fixture and the Timing Diagrams related to the high frequency driving control pulses necessary for controlling a power MOSFET's invertors circuit. The main functional blocks of an UC384x are an internal supply and protections block (ISP), a voltage references block (Vref), an output driver block (DRV), a pulse width modulation logic block (PWM Logic), a voltage error amplifier block (VEA), a voltage limiter block (VL), a pulse width modulation Comparator block (C), and an oscillator block (OSC). Eight I/O electrodes: Comp (1), Vfb (2), Is (3), RC (4), GND (5), Output (6), Vcc (7) and REF (8) are connecting the internal functional blocks to the controllers related circuit.

The ISP block supplies and protects all the other internal blocks against over voltages. The Vref block provides high precision (1%) references voltages to the internal and external (via REF electrode 8) circuit. The DRV block is basically a high voltage (20 v) buffer for the "Y" signal outputted by the PWM Logic block.

The main purpose of attaching the PWM Logic block between the PWM Comparator and DRV is to prevent more than one output pulse during one cycle of the OSC.

As the Timing Diagrams of FIG. 1B show, the OSC block provides the PWM Logic block with setting (Set) pulses having the frequency pre-established by a voltage ramp (VR) signal created externally by R3 and C1.

The Set pulse level is 0 (LOW) during the time when R3 is charging C1 (VR voltage level increases slow) and the Set pulse level is 1 (HIGH) during the time when C1 is internally discharged into the OSC block (VR voltage level decreases faster).

Obviously, the Set pulse lasting time is proportional to the value of C1 (as the C1 value increases, a longer discharge time follows).

When S reaches 0 (LOW) logic level (assuming that R is LOW already), the Y output (of the PWM Logic block) switch to 1 (HIGH) logic level. The Y output (and implicitly the main Output (6) electrode) remains at the HIGH logic level until one of the R, S inputs reaches the 1 (HIGH) logic level.

If the R input never switches to 1 (HIGH), then the Output (6) will provide a maximum duty cycle pulse similar, but in opposite phase, to the Set signal.

In order for R to switch to 1 (HIGH) the current sense Is (3) input's voltage level must be higher than the fraction of the Comp (1) voltage level delivered by the VL block (VLo) to the inverting input of the pulse width modulation comparator (C).

Typically, the Comp (1) voltage is resistively divided (⅓) and also limited at a maximum 1V by the VL block, so by buffering the VR-A signal incoming from RC (4) via a NPN transistor Q1 and adjusting its level properly, via the potentiometer P2, a lower maximum duty cycle can be set, in respect to the 1V maximum threshold established at the inverting input of the PWM comparator (C). P2 is able to adjust a maximum duty cycle, at any ratio between 30% and 90% (some of the UC384x controllers' series circuits contain inside an extra sub-circuit for limiting the maximum duty cycle at 50%). If, P2 is connected in series with a current sense resistor to ground, the PWM controller (C) can work in a Current/Voltage mode combination, which provides more stability to the entire circuit.

The minimum duty cycle is provided by VEA when the amount of voltage at Vfb (2) electrode is higher than Vref2 (2.5V+/−1%). R1, R2 and P1 are able to provide a voltage higher than 2.5V, since the REF (8) voltage is 5V (+/−1%).

R4 provides VEA with feedback and stability, R5 acts as a load for the Output (6) electrode and C2, C3 are preventing high frequency oscillations at Vcc (7) and REF (8) electrodes. By adjusting P1, the Output pulse minimum ON time can be decreased, in voltage mode, down to 1-3 µS, depending of the 384×IC manufacturer. The Timing Diagrams of FIG. 1B shows progressively the Output pulse as a function of the Set, VLo, Is and R signals.

In accordance with the above description, the Output pulse starts when Set reaches its (LOW) level, and stops when Reset reaches 1, so the DRV pulse duty cycle is proportional to the VLo signal momentary voltage level, in respect to GND (5). If R remains LOW, then Output pulse goes LOW when the next Set pulse rises (maximum duty cycle). If R remains HIGH or goes LOW after Set switches LOW, then the Output pulse remains LOW (no more Output pulses). The PWM comparator (C), is as fast as the minimum ON time of the Output pulse is short. Unfortunately, being designed as a current mode PWM controller, the existing 384×IC controllers series reaches, in voltage mode of operations (via Q1, as voltage ramp driver) a minimum Output pulse ON time around 1 µS or more, which is too long a time for accurate control at high frequency. For a high performances PFC System, the minimum ON time pulse needed is less than 0.1 µS (preferable 0.01 µS).

Description of a Classic PFC Circuits

FIG. 2 illustrates the most common Active PFC System containing, besides the Alternative Current Generator (Vac), five functional blocks such as a Low Pass Filter (LPF), a Bridge Rectifier (BR), a Power Factor Correction Large Signal Circuit (PFC-LSC), a Complex Load (CL) and a Power Factor Correction Small Signal Circuit (PFC-SSC), which is represented by the Controller Circuit and some extra parts such as Rvin and Rvout, included in a Controller Related Circuit (CRC).

The LPF block design purpose is to protect the input generator Vac from the high frequency noise incoming from the PFC-LSC block and usually contains an input filtrating capacitor Cf1, a symmetrical double coil filter Lf1 and a second filtrating capacitor Cf2. The BR block comprises a bridge of four rectifying diodes (Dr1-DR4) that convert the AC input voltage into a pulse (semi cycles) DC voltage. The CL block contains a bulk capacitor Cb and a resistive load R1. The PFC-LSC block comprises an inductor L1, a diode D1, a capacitor C1, a power MOSFET transistor M1 and some times, an additional snubber circuit including a capacitor Cs, a resistor Rs and a diode Ds. The purpose of this attached Snubber Circuit is to decrease the M1 heat dissipation cumulated at the beginning of it's each OFF cycle. Simply, when M1 switches OFF, its drain voltage increases very fast from zero up to 300-500 v, because of the coil L1 self-inductance (reverse voltage). The capacitor Cs, appearing in parallel to M1 (via Ds), creates a necessary delay (from a few hundred nS up to over one µS, function of Cs and L1 values) to this voltage increasing course. This delay must be long enough for the MOSFET to switch OFF completely, or at least to reduce substantially its drain-source current when M1 drain electrode reaches a significant high voltage (P=V*I). When M1 switches back ON, Cs is discharged into M1 via Rs, which reduces the discharge current.

This snubber circuit just decreases the MOSFET working temperature but does not increase the efficiency of the circuit, because the resistor Rs dissipates in heat about the same electrical energy that has been apparently saved from the M1's OFF switching transit time. The only advantage for attaching this circuit is a lower sized aluminum heat sink and/or a lower working temperature for M1.

The PFC-SSC includes a Multiplier (MULT) block, a Current Error Amplifier (CEA) block, a Voltage Error Amplifier (VEA) block, a PWM Comparator (PWMC) block, a PWM Logic block, an oscillator (OSC) block and a Driver (DRV) block.

As an important observation, except for the Multiplier sub-circuit, all of the other blocks are functional blocks of a typical PFC controller and are also included in the low cost PWM controller.

Five I/O electrodes such as Vins (sensing the Vin+momentary value), Is (sensing the M1 momentary current), DRV (providing the ON/OFF switching control to the gate of M1), Vfb (sensing the "Vo+" momentary amount) and GND are necessary in order for PFC-SSC to be able to control the PFC-LSC block.

When the voltage outputted by Vac is applied to the PFC-LSC through the LPF and BR blocks, the full-wave rectified pulse outputted by BR appears at Vin+ and Vin− (positive polarity at Vin+).

Initially at "Vo+" (in respect to GND), a DC voltage is created, in value slightly lower than the peak input voltage and the input current shape is similarly to the one shown in FIG. 14B.

The PFC-SSC block provides the gate of MOSFET (M1) with a relatively high frequency (30-200 KHz) square wave pulse. M1 remains ON until the current in L1 reaches a specific level, then switching OFF; the energy stored in L1 is then delivered to CL, through D1.

As soon Cb is charged to a higher value than the peak of Vin (boost converter), there is no more direct current between Vac and CL (BR diodes and D1 are reverse polarized) so the input current shape depends of the L1 average current only, which is controlled by the switching cycle of the Controller Circuit via M1.

The Multiplier block "MULT" is designed to control the MOSFET pulse in such a way (by multiplying the VEA signal in a specific ratio, function of "Vin+" level) that the momentary current value in L1 (via M1 circuit to GND) becomes proportional to the momentary AC generator voltage amount.

That forces the input current shape to follow the input voltage shape, in fact which pushes the PF parameter level near 1. The final input current shape may have any form, which means a PF parameter from about 0.9 to 0.999.

Cost vs. Performances

Therefore, a need exists for a Low Cost High Performances Power Factor Correction Circuit which is reliable, efficient, small sized, simple in design, includes a lower parts count and does not require a sophisticated and expensive Multiplier sub-circuit.

SUMMARY OF THE INVENTION

Brief Summary

Accordingly, the present invention is a "non-multiplier" Low Cost High Performances Power Factor Correction Circuit, including novel methods, systems and apparatuses, that substantially reduce one or more of the problems due to limitations and disadvantages of the related and/or prior art.

OBJECTS OF THE INVENTION

It is an object of the present invention to provide a new method of improving near unity the Power Factor parameter, not by using a Multiplier sub-circuit included in the main controller system, but by the means of a Constant Pulse Proportional Current (CPPC) Control Method, which forces the input current graphic form to follow the input voltage shape, (i.e. sine-wave) in an AC Generator—Complex Load System.

It is another object of the present invention to provide a near unity Power Factor Correction Boost Converter System, able to perform in accordance to the CPPC Control Method and procedure.

It is still an object of the present invention to provide a near unity Power Factor Correction Buck-Boost Converter System, able to perform in accordance to the CPPC Control Method and procedure.

It is yet another object of the present invention to provide a near unity PFC Controller System (NEWCTRL) having novel functional blocks and/or a novel system architecture, in order to perform in accordance to the CPPC Control Method and procedure.

It is also an object of the present invention to provide a Start Enforcement (SE) functional block sub-circuit(s) able to perform in accordance with the CPPC Control Method and being also compatible with the classic way (i.e. the Multiplier method) of control.

It is also another object of the present invention to provide a Non Linearity Correction (NLC) functional block sub-circuit(s), able to perform in accordance to the CPPC Control Method and procedure.

It is another object of the present invention to provide an Analog Reset Method (ARM) able to perform in accordance to the CPPC Control Method and also able to improve the analog-logic data transfer in a classic Mixed-Signal circuit.

It is still an object of the present invention to provide an Analog Reset Comparator (ARC) functional block sub-circuit(s), able to perform in accordance to the Analog Reset Method.

It is still another object of the present invention to provide an Analog Reset Oscillator (AR-OSC) functional block sub-circuit(s), able to perform in accordance to the Analog Reset Method.

It is yet an object of the present invention to provide an Analog Reset Pulse Width Modulator Logic (AR-PWM Logic) functional block sub-circuit(s), able to perform in accordance to the Analog Reset Method.

It is yet another object of the present invention to provide an Analog Reset Voltage Ramp Driver (AR-VRD) functional block sub-circuit(s), able to perform in accordance to the Analog Reset Method.

It is also an object of the present invention to provide an Analog Reset System (ARS) circuit(s), able to perform in accordance to the Analog Reset Method.

It is also another object of the present invention to provide an Analog Reset Pulse Width Modulation (ARS-PWM) Hybrid Controller circuit(s), able to perform in accordance to the Analog Reset Method.

BRIEF DESCRIPTION OF THE DRAWINGS

FIGS. 8A-C is a NEWCTRL sub-circuit schematic diagram including a $2^{nd}$, $3^{rd}$ and $4^{th}$ embodiment versions of its "NLC" functional block;

FIGS. 12A-C is a NEWCTRL sub-circuit schematic diagram including a $1^{st}$, $2^{nd}$ and $3^{rd}$ embodiment versions of an Analog Reset System PWM Hybrid Controller Circuit;

DETAILED DESCRIPTION OF THE PRESENT INVENTION

The Boost CPPC PFC-LSC Embodiment

General Description

Figure 3:
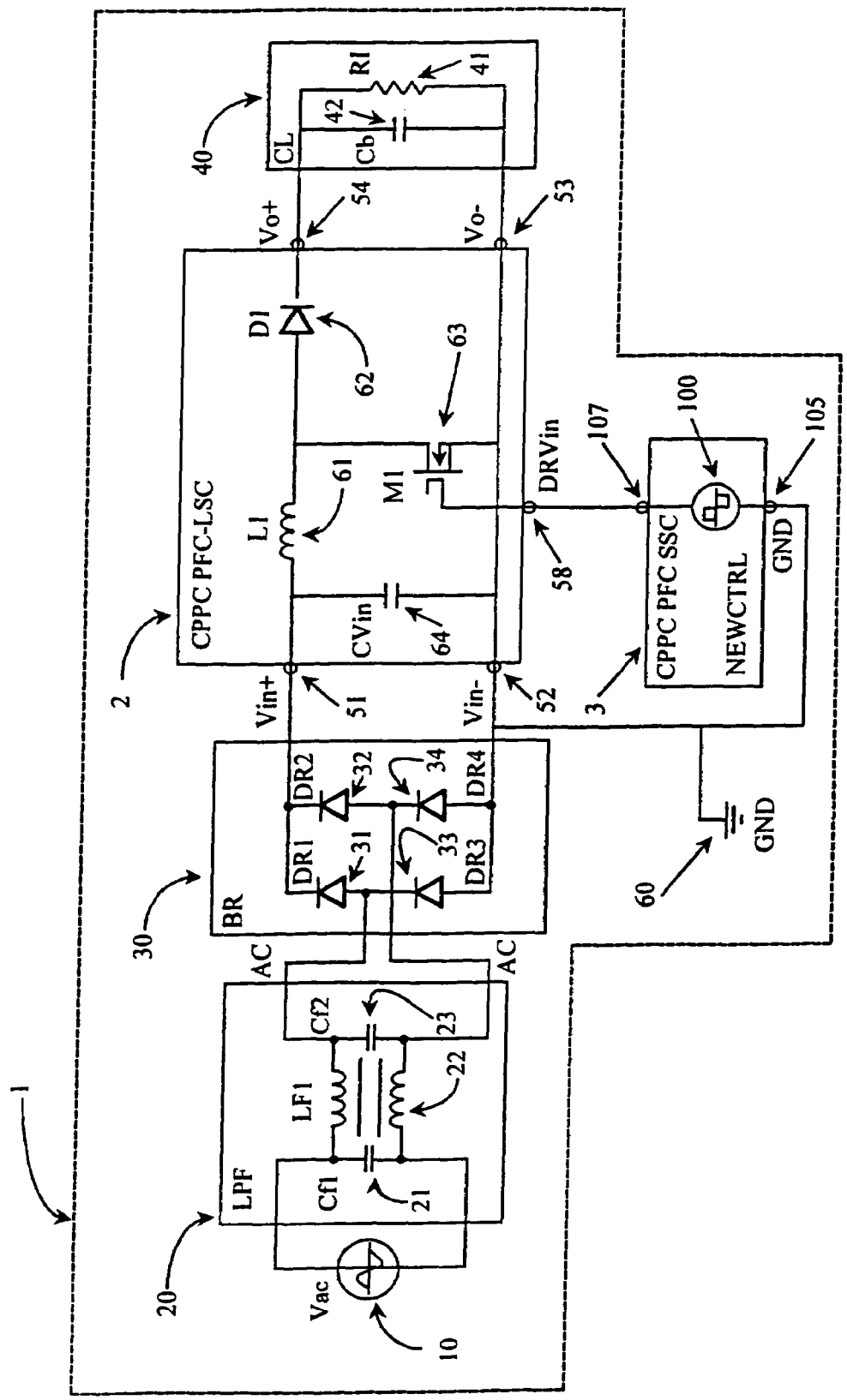
FIG. 3 is a Low Cost High Performances Power Factor Correction System (LCHPPFCS) schematic diagram, presenting the Boost Constant Pulse Proportional Current PFC Large Signal Circuit (CPPC PFC-LSC) embodiment of the present invention.

FIG. 3 illustrates, in accordance with the present invention, a Low Cost High Performance Power Factor Correction System—LCHPPFCS (1), comprising a Power Factor Correction Large Signal Circuit CPPC PFC-LSC (2) and a CPPC Power Factor Correction Small Signal Circuit PFC-SSC (3).

The LCHPPFCS (1) comprises, typically an alternating current Voltage generator Vac (10), a Low (frequency) Pass Filter block LPF (20), a Bridge Rectifier block BR, (30) a Complex Load block CL (40), and a boost Constant Pulse Proportional Current Power Factor Correction Large Signal Circuit block CPPC PFC-LSC (2).

The CPPC PFC-SSC (3) comprises, typically a Constant Pulse Proportional Current Controller Circuit CPPC CC and a Controller Related Circuit, however in this specific embodiment, it consists of just a "Constant (frequency, duty cycle and amplitude) Pulse" square wave generator (100). For the remainder of this description the particularly sub circuit presented as CPPC PFC-CC may be referred to as NEWCTRL (100) as a further subject of the present invention and important sub-circuit of the LCHPPFCS (1).

The Buck-Boost CPPC PFC Embodiment

General Description

Figure 4:
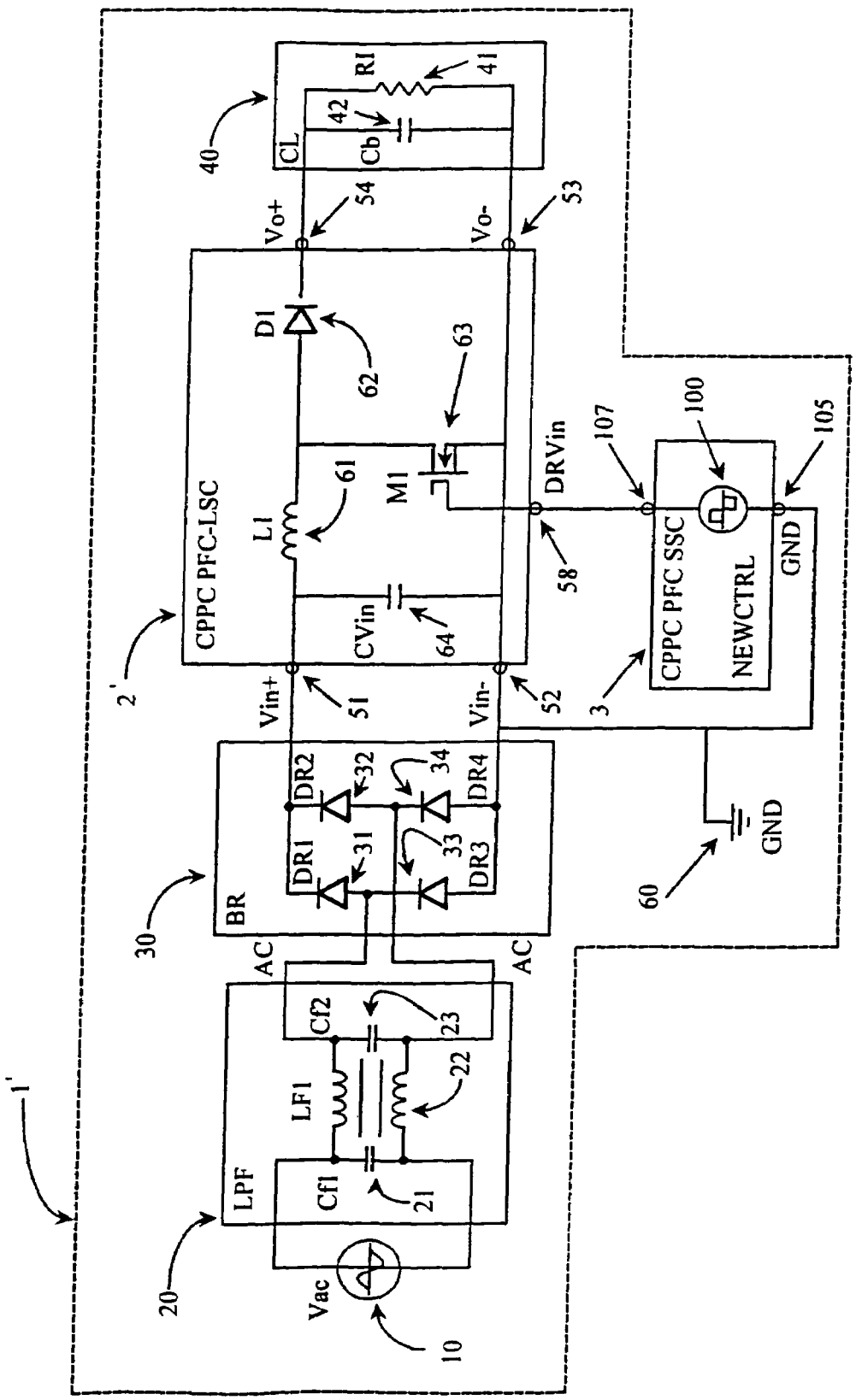
FIG. 4 is a LCHPPFCS schematic diagram, presenting the Buck-Boost CPPC PFC-LSC embodiment of the present invention.

FIG. 4 illustrates, in accordance with the present invention, a Low Cost High Performances Power Factor Correction System LCHPPFCS (1'), comprising a Power Factor Correction Large Signal Circuit CPPC PFC-LSC (2') and a Power Factor Correction Small Signal Circuit CPPC PFC-SSC (3). The LCHPPFCS (1') comprises, typically an alternating current Voltage generator Vac (10), a Low (frequency) Pass Filter block LPF (20), a Bridge Rectifier block BR, (30) a Complex Load block CL (40), and a buck-boost Constant Pulse Proportional Current Power Factor Correction Large Signal Circuit block CPPC PFC-LSC (2').

The CPPC PFC-SSC (3) comprises, typically a Constant Pulse Proportional Current Controller Circuit CPPC CC and a Controller Related Circuit, however in this specific embodiment; it consists in just a "Constant (frequency, duty cycle and amplitude) Pulse" square wave generator (100). For the reminder of this description the particularly sub circuit presented as CPPC PFC-CC may be referred to as NEWCTRL (100) as a further subject of the present invention and important sub-circuit of the LCHPPFCS (1').

The following description refers mainly to the implementation of a CPPC PFC Method into a LCHPPFCS (1') which represents the LSC section, a buck-boost CPPC PFC-IC LSC (2') block and in the SSC section CPPC PFC SSC (3), a Constant (frequency, duty cycle and amplitude) Pulse square wave generator NEWCTRL (100).

For the remainder of this description, the particular sub-circuit presented as CPPC PFC-LSC (2') block, may be referred to as a Buck-Boost CPPC PFC-LSC (2') as a subject of the present invention and important sub-circuit of this LCHPPFCS (1') embodiment version. Other embodiment versions for the LSC section as well as for the SSC section will be further described.

The Buck-Boost CPPC PFC LSC Embodiment

Reference will now be made in detail to an embodiment of the invention, illustrated in the accompanying drawings. In accordance with the present invention, in FIG. 4a LCHPPFCS (1') Embodiment is provided, comprising a CPPC PFC-LSC (2') and a CPPC PFC-SSC (3). The LCHPPFCS (1') includes, in this embodiment, an alternating current Voltage generator Vac (10), a Low (frequency) Pass Filter block LPF (20), a Bridge Rectifier block BR (30), a Complex Load block CL (40) and a Boost CPPC PFC-LSC (2').

The CPPC PFC-SSC (3) includes, in this embodiment, just a constant frequency-constant duty cycle square wave generator, as a representation of a new CPPC PCF Controller Circuit—NEWCTRL (100).

The Vac (10) is a low frequency (50-60 Hz) high voltage (90-240 Vrms) sine wave voltage generator which provides a full rectified AC voltage to CPPC PFC-LSC (2'), through the LPF (20), comprising two filtrating capacitor Cf1 (21) and Cf2 (23) flanking a symmetrical double coil Lf1 (22) and also through the BR (30), comprising four rectifier diodes DR1 (31), DR2 (32), DR3 (33) and DR4 (34).

The CL (40), comprises a resistive load R1 (41) across to a bulk (100-470 µF) capacitor Cb (42), is supplied by (and/or through) the Boost CPPC PFC-LSC (2') block.

The NEWCTRL (100) is (in this embodiment) just a simple high frequency (30-500 KHz) low voltage (12-20V) square wave generator, providing a "Constant Pulse" in amplitude, frequency and duty cycle.

The Boost CPPC PFC-LSC (2') as embodied herein, is a complex functional block having two input power electrodes Vin+ (51), Vin– (52), two output power electrodes Vo– (53), Vo+ (54) and a control electrode DRVin (58).

The figures suggest that the Boost CPPC PFC-LSC (2) improves the power factor in this circuit and the positions of the various terminals denote the function of each of them. In other words, in a CPPC PFC-LSC (2') schematic diagram, the internal architecture and the positions of the terminals will illustrate, alone, the particular function of each terminal. Internally, the Boost CPPC PFC-LSC (2') block, as embodied herein, contains a two terminal oscillating coil L1 (61), a high frequency (30-500 kHz) fast rectifier diode D1 (62), a high power high frequency (30-500 kHz) MOSFET transistor M1 (63) and a capacitor CVin (64).

The coil L1 (61) has one terminal coupled to Vin+ (51) and the other one coupled to the anode of D1 (62). The cathode of D1 (62) is coupled to Vo+ (54). M1 (63) has its drain electrode coupled to the anode of D1 (62), its source electrode to Vin– (52) and its gate electrode coupled to DRVin (58). CVin (64) is coupled across Vin+ (51) and Vin– (52). Vin– (52) is coupled to the system's ground GND (60). Vin+ (51) is coupled to Vo– (53).

The BR (30) has its AC input coupled to the LPF (20) output, its positive output coupled to Vin+ (51) and its negative output to Vin– (52). The CL (40) is coupled across the two output electrodes, Vo+ (54) and Vo– (53). The NEWCTRL (100) is coupled to DRVin (58) in respect to GND (60) via two CPPC PFC SSC (3) electrodes, respectively DRV (107) and GND (105).

The Buck-Boost CPPC PFC-LSC (2') block and the NEWCTRL (100), as embodied herein, act together as the LCHPPFCS (1) specific sub-circuits, able to improve near unity (PF>0.99) the power factor in a circuit, by the means of an internal Constant Pulse Proportional Current Control Method, which forces the current waveform shape to follow the voltage waveform shape, in an electrical AC Generator-Complex Load Circuit.

As further embodied herein, when a voltage is applied to the CPPC Buck-Boost CPPC PFC-LSC (2') having the positive polarity at Vin+ (51) and the negative polarity at Vin– (52) and M1 (63) is OFF, no voltage is created across the complex load CL (40), respectively across Vo+ (54) and Vo– (53), because there is no current in the Vin+ (51), L1 (61), M1 (63), Vin– (52) circuit (except a very small current in CVin and probably some very small residual current thru M1 circuit).

When NEWCTRL (100) starts commutating M1 (63) ON/OFF with a high frequency (30-200 kHZ), the DC voltage level across CL (40) will reach a DC voltage in an amount higher or lower than the input peak voltage, because of the electrical energy stored periodically by L1 (61) during the ON time of M1 (63) and delivered periodically, via D1 (62) to CL (40), during the OFF time of M1 (63).

If the charging/discharging time is constant in frequency and duty cycle and the ON time is short (end/or the OFF time is long) enough for keeping the coil L1 (61) within its linear range (in other words to prevent core saturation of the coil), then the L1 (61) circuit's current is directly proportional to the value of its supply voltage. The value of CVin (64) is too small to alter significantly the system's power factor, but large enough (100-220 nF) for protecting BR (30) for reverse high frequency oscillations.

Since the voltage inputted at Vin+ (51) is a full rectified sine wave and there is no bulk capacitor included in the BR (30) output circuit, the L1 (61) circuit's momentary current's value must follow a rectified sine wave's shape.

Therefore, in a Buck-Boost version of the CPPC PFC-LSC (2'), the Vac (10) current shape is similarly to the one illustrated in FIG. 14E (almost a sine wave) for any Vout/Vin ratio and without a need for a classic "Multiplier" in the controller circuit.

The CPPC PFC-SSC Generic System

General Description

Figure 5:
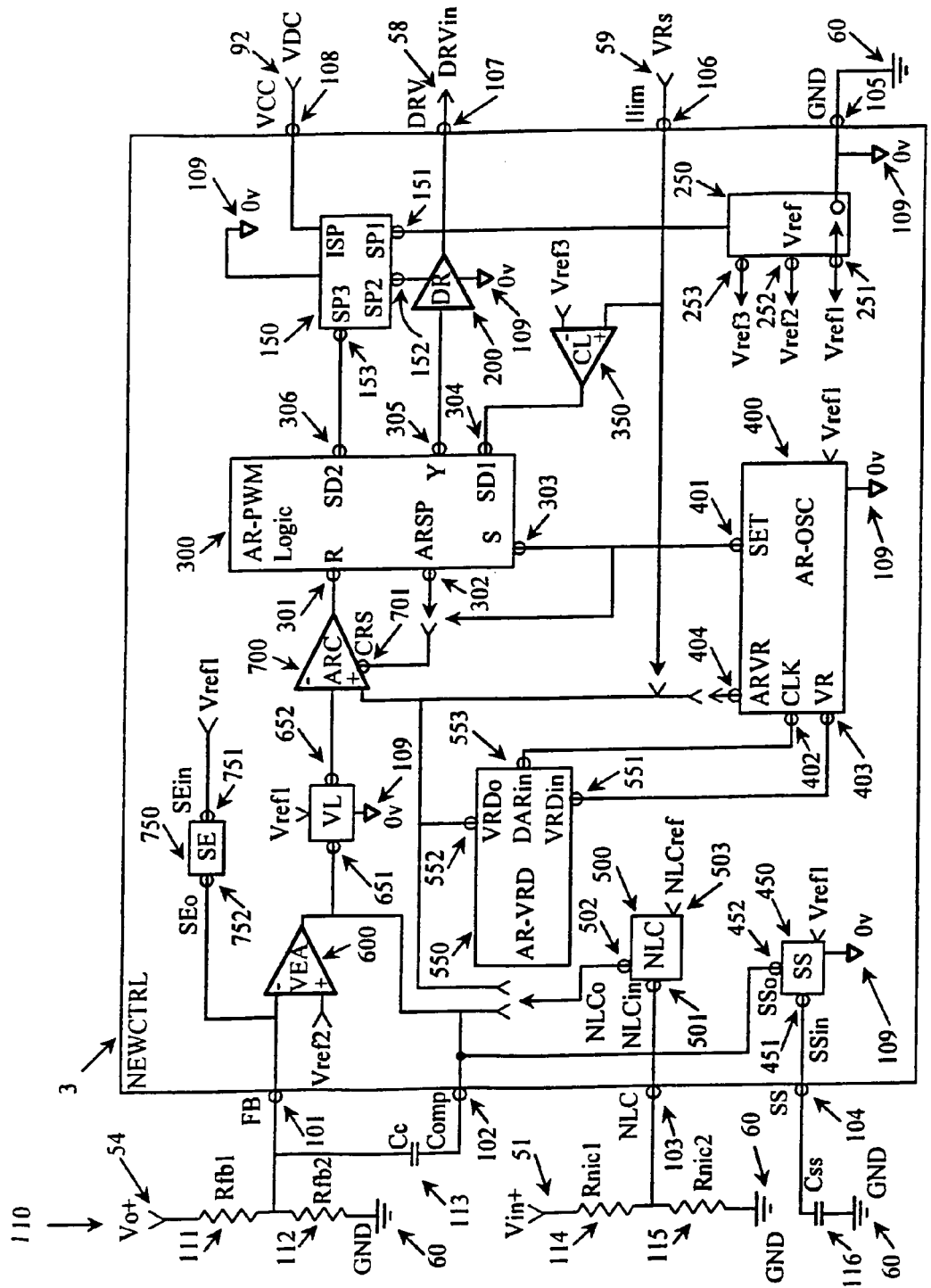
FIG. 5 is a generic schematic diagram embodiment for the Constant Pulse Proportional Current Power Factor Correction Small Signal Circuit including the CPPC PFC Controller Circuit (NEWCTRL) including 13 functional blocks such as the Internal Supply and Protection (ISP), Driver (DR), Current Limiter (CL), Voltage References (Vref), Analog Reset Pulse Width Modulation Logic (AR-PWM Logic), Analog Reset Oscillator (AR-OSC), Soft Start (SS), Non Linearity Correction (NLC), Analog Reset Voltage Ramp Driver (AR-VRD), Voltage Error Amplifier (VEA), Voltage Limiter (VL), Analog Reset Comparator (ARC), Start Enforcer (SE) and a minimum parts Controller Related Circuit.

FIG. 5 illustrates a constant pulse proportional current power factor correction small signal generic embodiment CPPC PFC SSC (3), as a complementary sub-circuit for the constant pulse proportional current power factor correction large signal circuit generic embodiment CPPC PFC LSC (2), in respect to the entire low cost high performances power factor correction system LCHPPFCS.

The generic embodiment presented in FIG. 5, includes a constant pulse proportional current power factor correction controller circuit CPPC PFC SSC (3) and a controller's related circuit, CRC (110).

The Controller Circuit

The NEWCTRL (3), subject of this invention, is a Complex Mixed Signal System connected to the rest of the LCHPPFCS (1) or (1') via eight I/O electrodes: a feedback electrode FB (101), a compensation electrode Comp (102), a non-linearity correction electrode NLC (103), a soft start electrode SS (104), a ground electrode GND (105), a current limiter electrode Ilim (106), a gate driving electrode DRV (107) and a supply electrode VCC (108).

The Controller's Related Circuit

Externally to the NEWCTRL (3), the CRS (110) includes a first feedback resistor Rfb1 (111), a second feedback resistor Rfb2 (112), a compensation capacitor Cc (113), a first non linearity correction resistor Rnlc1 (114), a second non linearity correction resistor Rvin2 (115) and a soft start capacitor Css (116).

Rfb1 (111) is coupled to Vo+ (54) and to FB (101) electrode, Rfb2 (112) is coupled to FB (101) electrode an to GND (60), Cs (113) is coupled between FB (101) electrode and Comp (102) electrode, Rvin1 (114) is coupled to Vin± (51) and NLC (103) electrode, Rvin2 is coupled to NLC (103) electrode and GND (60), and Css (116) is coupled to SS (104) electrode and GND (60).

GND (105) electrode is coupled to GND (60), Ilim (106) electrode is coupled to Vrs (59), DRV (107) electrode is coupled to DRVin (58), and VCC (108) electrode is coupled to VDC+ (93).

The Vin± (51), Vo+ (54), DRVin (58), Vrs (59) and VDC (92) electrodes as well as any other reference numbers or parts which do not appear in FIG. 5, belong to the NEWCTRL's (3) complementary sub-circuit, Boost CPPC PFC LSC (2), FIG. 4.

The Controller's Internal Circuit

Internally the NEWCTRL (3) as can be seen in FIG. 5 contains an internal supply and protections block ISP (150), a driver block DR (200), a voltage references block Vref (250), an analog reset pulse width modulator logic block AR-PWM Logic (300), a current limiter block CL (350), an analog reset oscillator block AR-OSC (400), a soft start block SS (450), a non linearity correction block NLC (500), an analog reset voltage ramp driver AR-VRD (550), a voltage error amplifier block VEA (600), a voltage limiter block VL (650), an analog reset comparator block ARC (700) and start enforcer block SE (750).

Figure 6:
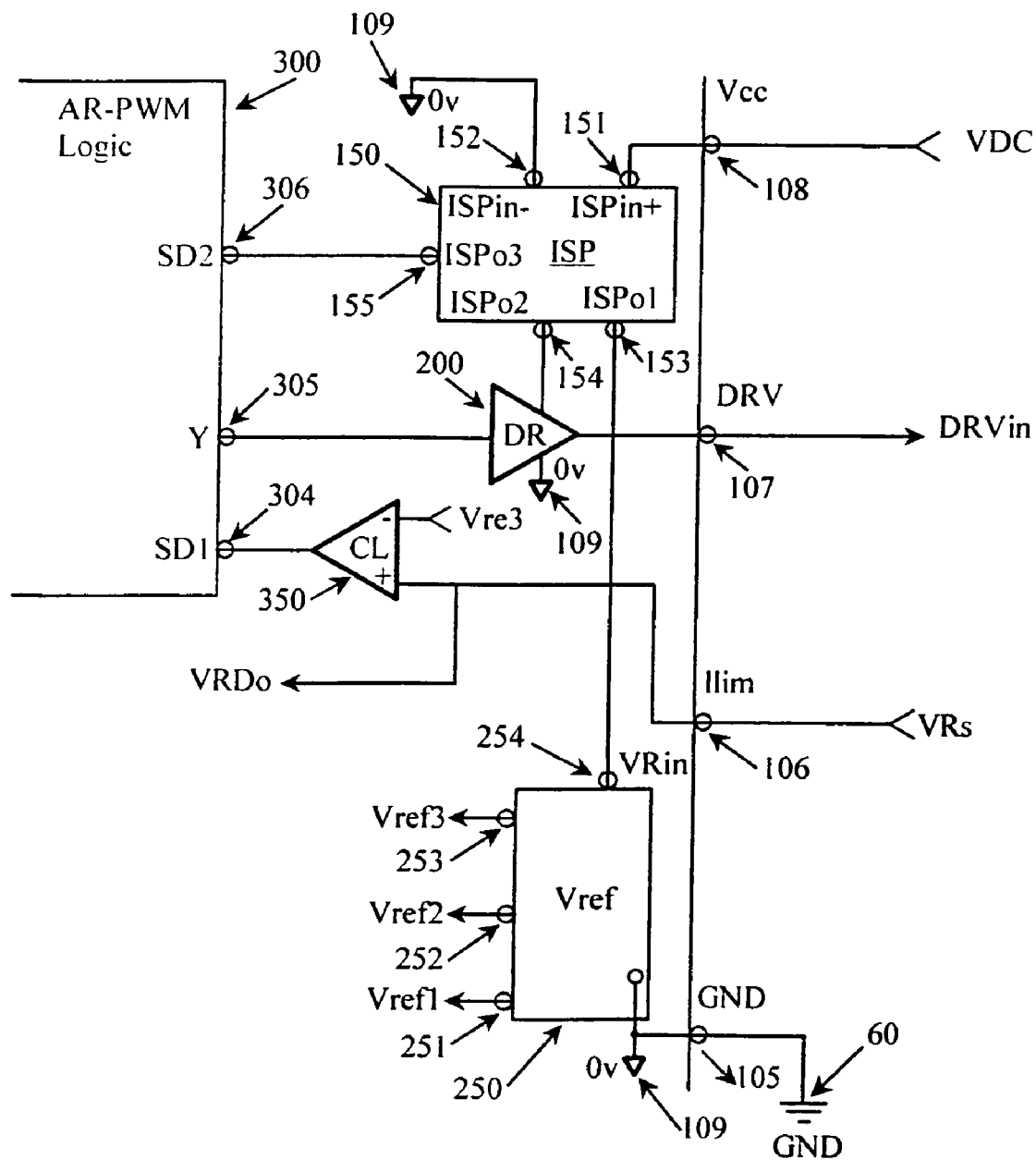
FIG. 6 is a NEWCTRL sub-circuit schematic diagram embodiment including its ISP, DR, CL, and Vref functional blocks.

Referring now to FIG. 6, ISP (150) is a one signal/four supply terminals block, comprising an ISPin+ (151) positive input supply electrode, an ISPin– (152) negative input supply electrode, a first ISPo1 (153) positive output supply electrode, a second ISPo2 (154) positive output supply electrode and an ISPo3 (155) signal output.

ISPin+ (151) is coupled to the NEWCTRL (3) supply electrode VCC (108), ISPin– (152) is coupled to 0 v (109), ISPo1 (153) is coupled to the Vref (250) block via a Vrin (254) electrode, ISPo2 (154) is coupled directly to the DR (200) positive supply input and ISPo3 (155) is coupled to the AR-PWM Logic (300) block, via a first shut down SD1 (306) electrode.

DR (200) is a two signal terminals buffer, supplied from the ISPo2 (154) in respect to the internal ground 0 v (109).

The DR (200) input is coupled to the AR-PWM-Logic (300) via a logic output Y (305) electrode and its output coupled to the NEWCTRL (3) driving output electrode, DRV (107).

Vref (250) is a five supply terminals voltage references provider block, comprising two input supply electrodes VRin+ (254), VRin– (255) and three output supply electrodes Vref1 (251), Vref (252) and Vref3 (253).

VRin+ (254) is coupled to ISPo1 (153), VRin– (255) is coupled to 0 v (109) and to the NEWCTRL (3) ground electrode, GND (105). Vref1 (251) supplies all the internal blocks except DR (200), Vref2 (252) provides a reference voltage to the non-inverting input of VEA (600) and Vref3 (253) provides a reference voltage to the inverting input of CL (350).

Referring again to FIG. 5, AR-PWM Logic (300) is a six signal terminals logic block, comprising a Reset input electrode R (301), an Analog Reset Sync Pulse output electrode ARSP (302), a Set input electrode S (303), a second shut down input electrode SD2 (304), an output Y (305) electrode and a second shut down input electrode SD1 (306).

R (301) is coupled to the output of the ARC (700), ARSP (302) is coupled to the ARC (700) block via a CRS (701) input electrode and in some circuit configurations (optional) is coupled also to the AR-VRD (550) block via a VRDar (553) electrode, S (303) coupled to the AR-OSC (400) via a SET (401) output electrode, SD2 (304) is coupled to the CL (350) output, Y (305) is coupled to the input of DR (200) and SD1 (306) is coupled to ISPo3 (153).

The CL (350) is a three signal terminal current limiter comparator having its output coupled to AR-PWM Logic (300) via SD1 (304), its inverting input coupled to Vref3 (253) and its non-inverting input coupled to the NEWCTRL (3) current limiter electrode Ilim (106).

The AR-OSC (400) is a four signal terminal oscillator block supplied by Vre1 (251) in respect to 0 v (109), comprising a SET (401) output electrode, a clock CLK (402) output electrode, a voltage ramp VR (403) output electrode and an analog reset voltage ramp ARVR ((404) electrode.

SET (401) is coupled to the AR-PWM Logic (300) block via S (303), CLK (402) is coupled in some circuit's configurations (optional) to the AR-VRD (550) block via a VRDar (553) electrode and one of VR (403) or ARVR (404) is optionally coupled to AR-VRD (550) via an input electrode VRDin (551).

The SS (450) is a two signal terminals soft start block supplied by the Vref1 (251) in respect to the 0 v (109), which has its input SSin (451) coupled to the NEWCTRL (100) soft start input electrode SS (104) and its output SSo (452) coupled to the NEWCTRL (100) compensation input electrode Comp (102).

The NLC (500) is also a two signal terminal non linearity correction block supplied by the Vref1 (251) in respect to the 0 v (109), which has its input coupled to the NEWCTRL (100) non linearity correction input electrode NLC (103) and its output NLCo (502) coupled, in some circuit's configurations (optional) to the NEWCTRL (3) compensation input electrode Comp (102) or, in other circuit's configurations (optional), to VRDo (554).

The AR-VDR (550) is a three signal terminals analog reset voltage ramp driver supplied by Vref1 (251) in respect to 0 v (109) comprising a voltage ramp input VRin (551) electrode, a voltage ramp output electrode VRo (554) electrode and a voltage ramp analog reset input VRar (553).

VRin (551) receives a voltage ramp signal from (optionally) VR (403) or ARVR (404).

VRo (552) is coupled to the ARC (700) non-inverting input and in some other circuit's configurations the voltage ramp signal outputted by VRo (552) to the ARC (700) non-inverting input, may be resistively summed with the signal incoming from Ilim (106) and/or the signal incoming from NLC (500) via its output NLCo (502).

VRar (553) receives reset signal from (optionally) ARSP (302) or CLK (402).

The VEA (600) is a three signal terminals voltage error amplifier having its inverting input coupled to the NEWCTRL (3) Feed-Back electrode FB (101), its non-inverting input coupled to the Vref2 (202) and its output coupled to the NEWCTRL (100) compensation input electrode Comp (102).

Reference is made herein to a VEA that includes various components in various embodiments. In some embodiments, reference is made to an analogic output or an sink analogic output. The output value of an analogic output can range between a minimum and maximum value. On the other hand, a digital output can have only one of two states, such as a logical 0 and a logical 1 so that when a signal is high it is interpreted as a logical 1 and when the signal falls below a certain value it is considered a logical 0.

The VL (650) is a two terminals voltage limiter block supplied by Vref1 (251) in respect to 0 v (109), which has its input VLin (651) coupled to the VEA (600) output Comp (102) and its output coupled to the inverting input of ARC (700).

The ARC (700) is a three signal terminals Analog Reset Comparator having its output coupled to R (301), its inverting input coupled to the NEWCTRL (100) compensation input electrode Comp (102) and its non-inverting input coupled to VRo (554).

The SE (750) is a two signal terminals start enforcer block comprising a SEin (751) input electrode coupled to the Vref1 (251) and a SEo (752) output electrode coupled to the NEWCTRL (3) Feed-Back electrode FB (101).

Each of the above functional blocks' internal architecture will be in details further described as a sub-circuit of the NEWCTRL (3) and/or as an independent system.

Design and Implementation

The NEWCTRL (3) internal architecture is simple, following mostly a standard PWM structure and not a PFC one (no multiplier and related circuit involved) being design to deliver a "Constant Pulse" in amplitude, frequency and duty cycle to the gate of M1 (63), during at least one semi-cycle of the Vac (10), in order for the entire LCHPPFCS (1) to provide high PFC performances (i.e. PF>0.99, THD<5%).

The "constant amplitude condition" is insured by the NEWCTRL's (3) supply voltage imputed to ISP (150) via VCC (108) which supposed to be not lower than 12 v and limited to maxim 20V by ISP (150) before is delivered to the DR (200).

In this range of voltage, M1 (63) works properly and is fully saturated during its ON switching time.

The "constant frequency condition" is insured by the NEWCTRL's (3) oscillator block AR-OSC (400), which in a standard design may vary 0.5-2%, without affecting too much the entire PFC circuit performances.

For the "constant duty cycle driving pulse during at least one Vac (10) semi-cycle condition", several factors involving the Vac (10) amplitude, the M1 (63) circuit and the CL (40) circuit momentary currents, must be considered.

When the Vac (10) voltage is at its minim value (i.e. 90Vrms) and/or the CL (40) requests its maxim current (i.e. 0.5 A for a 400V/200w output) the NEWCTRL's (3) driving pulse must reaches its maxim duty cycle (i.e. 50-70%).

When the Vac (10) voltage is at its maxim value (i.e. 260Vrms) and/or the CL (40) request its minim current (i.e. 0.05 A for a 400V/20w output) the NEWCTRL's (3) driving pulse must reaches its minimum duty cycle (i.e. 0.1-10%).

When the Vac (10) voltage is higher than its maxim acceptable value (i.e. 280Vrms) and/or the CL (40) request no current (i.e. no load and Vo>400V) the NEWCTRL's (3) driving pulse reaches 0 duty cycle (no driving pulse).

In this configuration of the NEWCTRL's (3) design, the driving pulse's maxim duty cycle is internally limited by the AR-OSC (400) or AR-VRD (550) blocks.

The momentary duty cycle outputted at DRV (107) is a function of the momentary value of the voltage inputted at FB (101) and/or NLC (103) and or him (106).

The current limiter input Ilim (106) is mostly a protection electrode for a too high current in M1 (63) circuit, so if the sense resistor Rs (64) is properly calibrated and the coil L1 (61) is not pushed out of its linear range, the voltage inputted at Ilim (!06) does not modify significantly the driving pulse duty cycle during one Vac (10) semi-cycle.

The non-linearity correction input NLC (103) is sensible only to high AC input voltage or low Vout/Vin ratio, so if the resistors Rv1 (114) and Rv2 (115) are properly calibrated, the voltage inputted at NLC (103) also does not modify significantly the driving pulse duty cycle during one Vac (10) semi-cycle.

The feedback electrode FB (101), which controls the duty cycle in respect to the Vo+ (54) momentary voltage also can not modify significantly the driving pulse duty cycle during one Vac (10) semi-cycle because the bulk (100-470 μF) capacitor Cb (42) is able to keep relatively constant the Vo+ (54) voltage during one Vac (10) semi-cycle and more than that, the compensation capacitor Cc (113) is specifically calibrated (function of Cb (42) value) for preventing fast duty cycle variations.

Therefore, the NEWCTRL's (3) is capable to deliver a "Constant Pulse" in amplitude, frequency and duty cycle during, at least, one semi-cycle of low frequency high voltage generator Vac (10).

The ISP, DR, Vref and CL Blocks

General Description

FIG. 6 illustrates the controller's Supply, Protection, References and Output sub-circuit, comprising the ISP (150), DR (200), Vref (300) and CL (350) functional blocks.

The ISP block

ISP (150) is the internal supply and protection block comprising comparators with hysteresis, transistors and zener diodes in order to keep within acceptable limits (typically 12-20 v) the supply voltage delivered internally to DR (200) and Vref (250) and also to be able to provide a shut down pulse (logic 1) to AR-PWM Logic (300) in situations when the voltage incoming at VCC (108) is either too high (over 20V) or too low (less than 12V).

This ISP (150) block has no special requirements in respect to the similar ISP block included in the classic UC384x Circuit.

The DR Block

DR (200) block is basically a high voltage (20 v) buffer of the signal provided by the PWM Logic (300) block at its Y (305) output. It must be able to drive, in good conditions a regularly MOSFET's gate, via DRV (107) output electrode, so a max 1 Apk current (200 mA continuous) and about 100 nS pulse raising time are the main challenging specs of this buffer.

The Vref Block

Vref (250) is the functional block which provides at least three (Vref1, Vref2, Vref3) fixed (stable) supply and/or references voltages to all the other NEWCTRL (3) blocks and includes at least one high precision (1% preferable) Voltage Gap Reference.

Vref1 (251) delivers typically 5.0V, and besides its supply and high precision reference attributes, its output provides a very low impedance to ground (i.e. switch), during the time when stays at 0 v level, fact which allows for a fast discharge of any capacitor included in its circuit (similarly to an automatically reset system).

This Vref (250) block also has no special requirements in respect to the similar DRV block included in the classic UC384x-PWM series.

The CL Block

CL (350) is a comparator which shuts down (keeps at low level) the AR-PWM Logic (300) driving signal output Y (305), when the voltage level at Ilim (106) exceeds the Vref3 (253) voltage level.

In some lower cost circuit's versions, were the voltage incoming at Ilim (106) is resistively summed with VRDo (552) signal delivered to the ARC (700) non-inverting input, almost similarly performances could be obtained without this extra comparator CL (350) to be include in the internal circuit of the NEWCTRL (3).

This current limiter comparator CL (350) does not exist in the classic UC384x Circuit; however its implementation does not significantly affect the complexity degree level and/or the cost/unit amount of a new controller.

The VEA, VL, SS, SE and NLC Blocks

General Description

Figure 7:
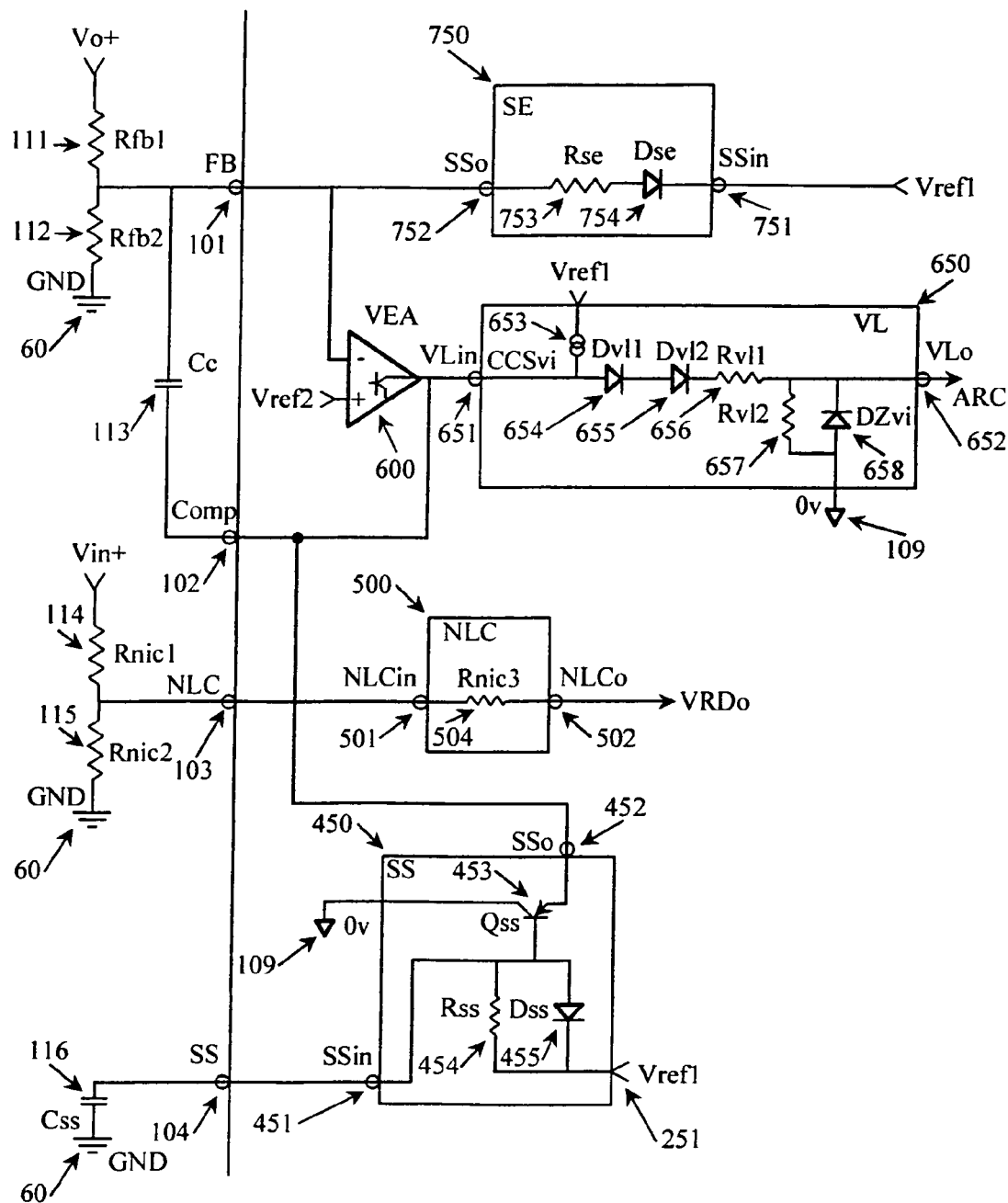
FIG. 7 is a NEWCTRL sub-circuit schematic diagram embodiment including its SS, NLC, VEA, VL" and SE functional blocks.

FIG. 7 illustrates the controller's Feed-back, Corrections and Starter Signal Input sub-circuit, comprising the SS (450), NLC (500), VEA (600), VL (650) and SE (750) functional blocks.

The VEA Block

VEA (600), is a "current sink only" (open collector) operational amplifier acting as a voltage error amplifier block which controls the voltage level at Comp (102) in a classic "differential" manner with respect to the voltage amounts at FB (101) and Vref2 (252).

The momentarily amount of voltage at Comp (102) determines, via ARC (700), AR-PWM Logic (300) and DR (200), the momentarily duty cycle of the driving pulse outputted at DRV (107) in such a manner that, as high is Comp (102) voltage level, as large will be the percent amount of the driving pulse's duty cycle.

The voltage amount at FB (101) is set by the two feedback resistors Rfb1 (111) and RFB2 (112). The ratio of these to resistors is calculated to provide a feedback voltage near Vref2 (252), respectively about 2.5V (typically) when the Vo+(54) voltage reaches its pre-established maxim voltage (typically 380420V).

As soon the Vo+ (54) voltage level goes beyond its pre-established amount, the voltage at FB (101) will exceed the Vref2 (252) voltage amount and VEA (600) will decreases the amount of voltage at Comp (102), fact that forces the output pulse's duty cycle to decrease and finally the Vo+ (54) voltage amount, also to decrease proportionally.

Since the driving pulse has a high frequency (30-500 kHz) and the load's bulk capacitor Cb (42) value is relatively large (100-470 μF), the VEA (600) feedback circuit is able to keep easily the Vo+ (54) voltage amount in a +/−2% range, typically.

In order to keep the duty cycle constant (i.e. Constant Pulse), the value of the compensation capacitor Cc (113) must be properly calibrated (large enough) for keeping the VEA (600) output at a relatively constant level at least one Vac (10) semi-cycle.

The VL Block

VL (650) comprises a constant current source CCSVL (653), a first zener diode ZVL1 (654), a first resistor RVL1 (655), a second resistor RVL2 (656) and a second zener diode ZVL2 (657).

CCSVL (653) is coupled to VLin and the cathode of DZVL1 (654). The cathode of DZVL1 (654) is coupled to VLo (652) via RVL1 (655). RVL2 and DZVL2 are coupled in parallel from VLo (652) to 0 v (109). The cathode of DZVL2 is coupled to VLo (652).

This "constant current source/voltage limiter circuit" delivers a 1V max voltage amount at Comp (102), so the VEA (600) control of the Comp (102) voltage to be restricted within a 0-1V range, in respect to 0 v (109).

Also, for externally shut down and/or soft start purposes, the VL (650) block allows for a LOW Output (no pulse) at DRV (107) in the situations when Comp (102) is pushed down to a voltage level lower than 1V (because DZVL1 threshold is about 1V).

The SS Block

SS (450) includes a PNP transistor Qss (453), a resistor Rss (454) and a diode Dss (455). The Qss has its collector coupled to 0 v (109), its emitter coupled to Comp (102) via SSo (452) and its base coupled to SS (104) via SSin (451) and to Vref1

(251) via Rss (454) in parallel to Dss (454). The anode of Dss (54) is coupled to the base of Qss (453).

When Vref1 (251) is "low" (0 v), Comp (102) is low also because of the Qss (453) and Rss (454). When Vref1 (251) switches "high" (5v typically), the capacitor Css start charging via Rss (454), fact which allows the Comp (102) voltage amount to increase slow, up to its maximum of 1V.

When the voltage at SS (104) exceeds 1 v the base-emitter junction of Qss (453) is reverse polarized (very large impedance), so after this threshold, the SS (450) devices are not included anymore in the Comp (102) circuit.

When Vref1 (251) switches back "low" (0 v), Css (116) is discharged (reset) via Dss (455) and the low impedance to GND (switch) of the Vref1 (251) electrode.

In other words, the SS (450) block forces a slow increase of the Comp (102) voltage for a short time (proportional to Css and Rss) only, during each supplying transit time. A few milliseconds after the system is supplied with DC voltage, Qss (453) disconnects the SS (450) system from the Comp (102) circuit.

Since the output driving pulse's duty cycle is proportional to the Comp (102) voltage amount, the SS (450) circuit forces a safe graduated increasing duty cycle, in order to avoid a too high current amount in the M1 (63) circuit.

This SS (450) block is not included inside of a classic UC384x Circuit; however its implementation does not significantly affect the complexity degree level and/or the cost/unit amount of a new controller.

The SE Block

SE (750) comprises a resistor Rse (753) and a diode Dse (754).

Dse (754) has its cathode coupled to the SSin (751) block's input terminal and its anode are coupled to the SSo (753) block's output terminal, via Rse (753).

The purpose of this attached functional block is to assure the circuit "start process" in some critical situations, respectively when the NEWCTRL (3) is (A) included in a self-supply system, (B) the input ac voltage Vac (10) is above 200Vrms and (C) the resistive load R1 (41) has a very high value or is initially disconnected from the circuit (very low or even zero load current).

The NLC Block

In FIG. 7 shows a first NLC (500) embodiment version, as subject of this invention, comprising just a simple resistor Rnlc (504) coupled across NLCin (501) which is connected to the NEWCTRL (100) non linearity control input NLC (103) and NLCo (502), which is connected, in parallel to VRDo (552) for modulating the voltage ramp signal delivered to the non-inverting input of the ARC (700).

As further embodied herein a Non Linearity Correction system NLC (500), able to decrease the controller's driving pulses' duty cycle, in a Boost CPPC PFC System, while the AC generator's momentary voltage amount exceeds half of the output load's DC voltage, contains one resistor Rnlc (504) connected from NLC (103) to the non-inverting input of the ARC (700).

The Rnlc1 (504) designed function, in this NLC (500) embodiment configuration, is to ad to the voltage ramp signal delivered by VRDo (552) to the non inverting input of ARC (700), a fraction of the Vin+ (51) signal delivered via Rnlc1 (114), Rnlc2 (115) and the NEWCTRL (3) input non linearity correction input NLC (103).

The NLC Block

General Description

NLC (500) is a non linearity correction circuit which can be embodied in several different configurations according to the main design consideration, such as cost, accuracy of control, simplicity, less controller's pin-out count, etc.

This block represent another simple solution of resolving the main inconvenient of the boost CPPC PFC System, respectively a non linear increasing of the AC generator current when the peak input voltage exceeds half of the output DC voltage.

FIGS. 8A-C illustrates three more embodiment versions, of the NLC (500) block.

The $2^{nd}$ NLC block Embodiment

FIG. 8A shows a different configuration of the NLC (500) System, as subject of this invention, implemented in a three signal I/O electrodes such as NLCin (501), NLCo (502) and NLCref (503).

In this configuration, NLC (500) System comprises internally, a sink-only (open collector) operational amplifier OAn (505), a first resistor Rn1 (506), a second resistor Rn2 (507) and a capacitor Cn (508).

The OAn (505) has its output coupled to NLCo (502), its non-inverting input coupled to NLCref (503) and its inverting input coupled to NLC in (501) via Rn1 (506). Rn2 (507) and Cn (508) are both, in parallel, coupled between the inverting input and the output of OAn (505), as a classic OPAM's negative feedback.

The $4^{th}$ NLC block Embodiment

FIG. 8B shows a different configuration of the NLC (500) System, as subject of this invention, implemented into controller's related circuit CPPC PFC CRC (110), respectively into the FB (101)-Comp (102) circuit.

In this configuration, NLC (500) System comprises two resistors Rn3 (511) and Rn4 (512) attached to the existing Rfb1 (111), Rfb2 (112) and Cc (113) feedback and compensation circuit of the NEWCTRL (3).

Rn3 (511) is connected from Vin+ (51) to FB, Rn4 (512) is coupled from FB (101) to the middle connection of the Rfb1 (111) and Rfb2 (112), the other terminal of Rfb1 is coupled to Vo+ (54), the other terminal of Rfb2 is coupled to 0 v (109) and Cc (113) is coupled from the middle connection of the Rfb1 (111) and Rfb2 (112) to Comp (102).

The 3d NLC Block Embodiment

FIG. 8C shows a final different configuration of the NLC (500) System, as subject of this invention, implemented into controller's related circuit CPPC PFC CRC (110), respectively into the FB (101) sub-circuit which does not use a large value compensating capacitor.

In this configuration, NLC (500) System comprises two resistors Rn5 (513) and Rn6 (514) attached to the existing Rfb1 (111), Rfb2 (112) circuit of the NEWCTRL (3).

The new feedback circuit contains a first feedback resistor Rfb1 (111), Rfb2 (112) coupled from Vo+ (54) to FB (101), a second feedback resistor Rfb2 (112) coupled from FB (101) to 0 v (109) via Rn6 (516) and a feedback capacitor Cfb (122) coupled in parallel to Rfb2 (112). Rn5 (515) is coupled from the middle connection of Rn6 (516) and Rfb2 (112) to Vin+ (51).

The Pulse Width Modulation Sub-circuit

FIG. 19 shows comparatively, a classic PWM circuit in the section A, versus four different versions of Analog Reset PWM circuits, presented in the sections B to E.

The Classic PWM Circuit

Generically, a PWM circuit is a mixed signal system able to deliver a variable duty cycle square wave (digital) driving signal, in a ratio direct proportional to the momentary voltage amount comparatively sensed by its (analog) inputs, respectively a variable feedback signal and a synchronized voltage ramp signal.

Typically the synchronized voltage signal is provided by a square wave/voltage ramp wave's oscillator (generator) circuit, which also provides setting (sync) pulses to a PWM Logic circuit, attached for allowing not more than one output driving pulse per each oscillator cycle.

Figure 9A:
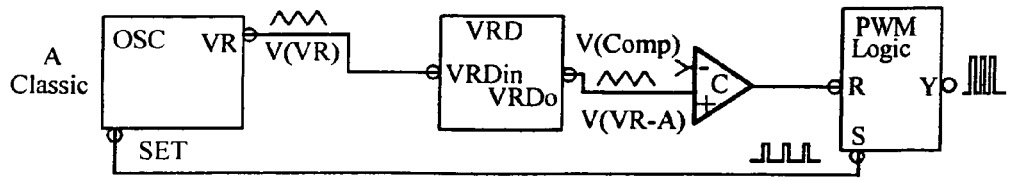
FIGS. 9A-E is a NEWCTRL sub-circuit schematic diagram including a $1^{st}$, $2^{nd}$, $3^{rd}$ and $4^{th}$ embodiment versions of its "ARS-PWM" circuit including the AR-OSC, AR-VRD, ARC and AR-PWM functional blocks, versus a classic PWM circuit.

FIG. 9A shows a classic voltage mode PWM circuit comprising four functional blocks, respectively a two signal outputs (SET) and (VR), oscillator (OSC) block, a one input (VRDin)—one output (VRDo) voltage ramp driver (VRD) block, a two inputs—one output comparator (C) block and a two inputs (R, S) one output (Y) pulse width modulation logic (PWM Logic) block.

FIGS. 15A-E illustrates the shape of the most significant PWM circuit's signals delivered in FIG. 9A (classic PWM) vs. section 9B (AR-PWM), respectively "V(SET)", "V(VR)", "V(Comp)", "V(VR-A)", "V(RES-A)", and "V(DRV-A)".

Accordingly, the output signal "V(DRV-A) duty cycle ratio outputted by the PWM Logic circuit is direct proportional to the momentary voltage amount sensed by the comparator (C) inverting input "V(Comp)" in respect to the synchronized voltage ramp signal "V(VR-A)" incoming via a voltage ramp driver (VRD) from a square wave/voltage ramp wave's oscillator (OSC) and inputted at the comparator's non-inverting input.

The OSC block delivers a "V(SET)" signal via its output SET to the S input of PWM Logic block and also delivers a "V(VR)" signal via its VR output to the VRDin input of the VRD block. The VRD block delivers a "V(VR-A)" signal to the non-inverting input of the comparator C, versus a decay DC voltage "V(Comp)" applied to the inverting input of the comparator C. The comparator C output delivers a "V(RES-A)" signal to the PWM Logic R input. The PWM Logic output Y delivers a "V(DRV-A)" signal.

The 1, ARS PWM Sub-Circuit Embodiment

Figure 9B:
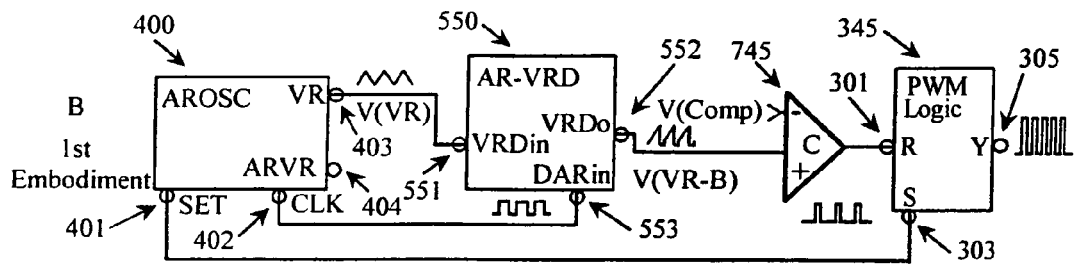

In FIG. 9B an ARS-PWM (3) sub-circuit is provided, as subject of this invention, comprising four functional blocks, respectively a four signal outputs SET (401), CLK (402), VR (403) and ARVR (404) analog reset oscillator AR-OSC (400) block, a two inputs VRDin (551), DARin (553)—one output VRDo (552) analog reset voltage ramp driver AR-VRD (550) block, a two inputs—one output classic comparator C (745) block and a two inputs (R, S) one output (Y) classic pulse width modulation logic PWM Logic (345) block.

The ARVR (404) output of the AR-OSC (400) block is not used in this ARS-PWM (3) sub-circuit (system) version.

AS FIG. 9B shows, in this system configuration, only the AR-OSC (400) and AR-VRD (550) blocks request the implementation of the Analog Reset method.

The AR-OSC (400) block delivers a "V(SET)" signal via its output SET (401) to the S (302) input of PWM Logic (345) block, a "V(CLK)" signal via its CLK (402) output to the DARin (553) input of AR-VRD (550) and also delivers a "V(VR)" signal via its VR (403) output to the VRDin (351) input of the AR-VRD (550) block. The AR-VRD (550) block delivers a "V(VR-B)" signal to the non-inverting input of the comparator C, versus a decay DC voltage "V(Comp)" applied to the inverting input of the comparator C. The comparator C output delivers a "V(RES-B)" signal to the PWM Logic (395) R (301) input. The PWM Logic (395) output Y (305) delivers a "V(DRV-B)" driving signal.

The classic low speed (low cost) current mode PWM circuit's inconvenient (i.e. in voltage mode PWM, the duty cycle cannot be forced down to 1% or less) does not occur in this situation because the important condition of the classic PWM Logic circuit Truth Table (ie. for Y=1, R must be LOW before S switches LOW has been satisfied by implementing the Analog Reset Method in this particularly PWM circuit.

Figure 15:
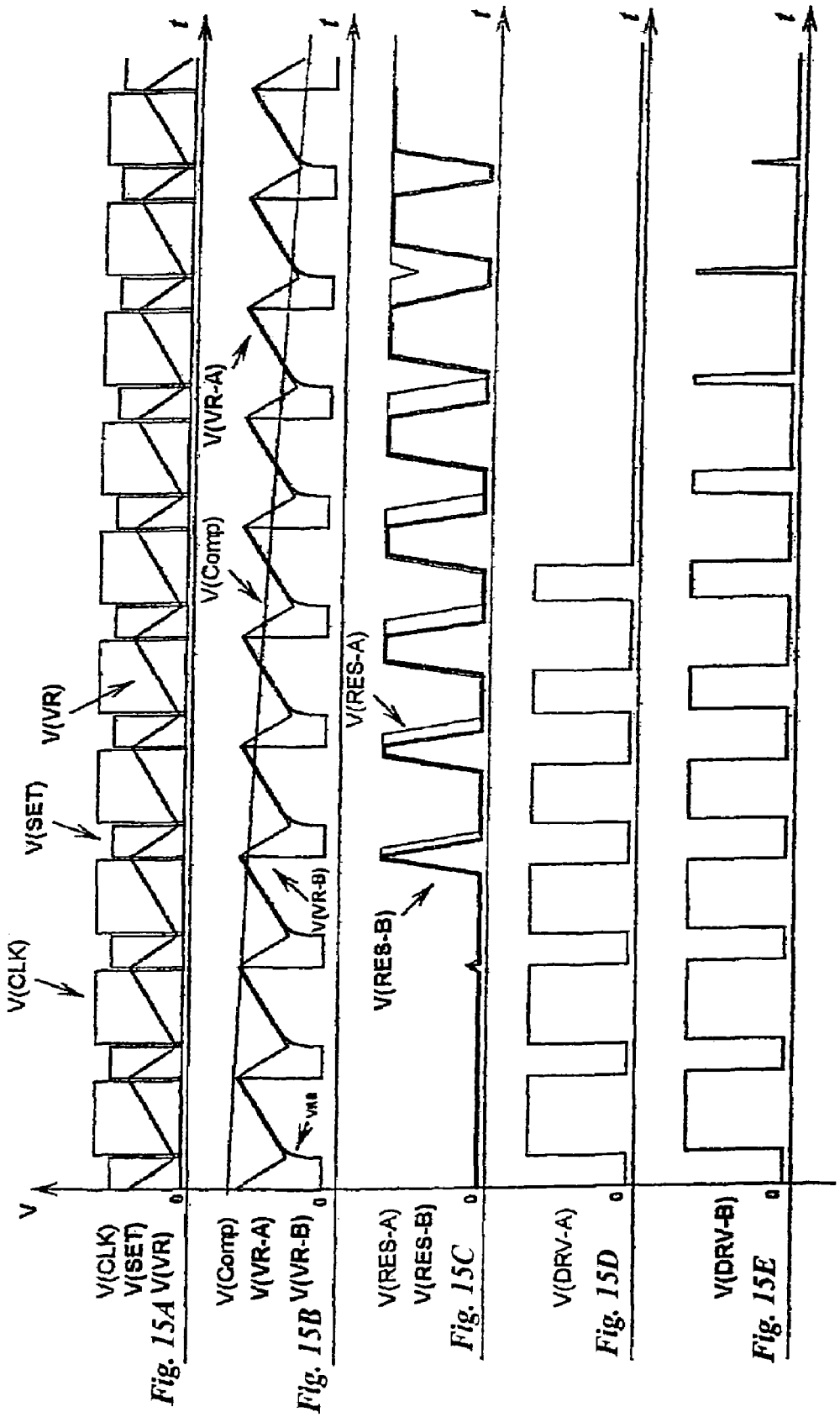
FIG. 15A-E is a graphic representation for the Classic PWM vs. ARS PWM Circuit's Voltage Timing Diagrams.

FIG. 15A shows that the "V(CLK)" signal is identical but in opposite faze to the "V(SET)" signal, and the V(VR) signal increases linearly when "V(SET)" is LOW and decreases linearly when "V(SET)" is HIGH.

FIG. 15B shows that unlike "V(VR-A)", the "V(VR-B)" signal applied to the C (745) non-inverting input, is rapidly pushed near 0 v by "V(CLK)" as soon "V(SET)" switches HIGH and then is kept at LOW level during the entire "V(SET)" pulse ON time.

Also unlike "V(VR-A)" which is crossing slow the "V(Comp)" decay signal applied to the C (745) inverting input, the "V(VR-B)" voltage level drops much faster under the "V(Comp)" voltage level, forcing an earlier output switching (typically 4 μS @ 100 kHz running frequency). Since a very low speed (low cost) classic comparator does not need more than 2-3 μS to switch to a firm LOW state, a "V(SET)" pulse ON time of 4 μS is more than enough for a safe Analog Reset accomplishment.

FIG. 15C shows that, because the "V(VR-B)" signal reaches a lower voltage level than the "V(Comp)" momentary voltage amount a few microseconds earlier than the "V(VR-A)" signal, implicitly the "V(RES-B)" signal reaches its LOW logic state a few microseconds before the "V(RES-A)" signal.

FIG. 15E shows that in accordance to the PWM Logic Truth Table, the "V(DRV-B)" pulse starts immediately when the "V(SET)" pulse falls to its LOW logic level (0) and ends when either "V(RES-B)" and/or "V(SET)" switch to the HIGH logic level (1). Accordingly, the "V(DRV-B)" pulses ON time decrease proportional to the "V(Comp)" decay in respect to "V(VR-B)" and the "V(DRV-B)" signal is delivered until it reaches a ratio even lower than 1% duty cycle and start decreasing in amplitude.

Despite the PWM comparator C (745) low speed, if the "V(VR-B)" pulse is forced in LOW state before "V(SET)" switch LOW (i.e. the "V(SET)" pulse ON time is equal or larger than the PWM comparator's output "failing time"), than the shortest "V(DRB-B)" driving pulse (AR-PWM System) is much shorter than the "V(DRB-A)" shortest driving pulse (Classic PWM System, FIG. 15D), going finally as short as the digital devices switching speed allows. When the pulse width is forced shorter than the digital buffer's total switching time (raise time plus fall time), then of course the output driving pulse start decreasing in amplitude.

The 2$^{nd}$ ARS PWM Sub-Circuit Embodiment

Figure 9C:
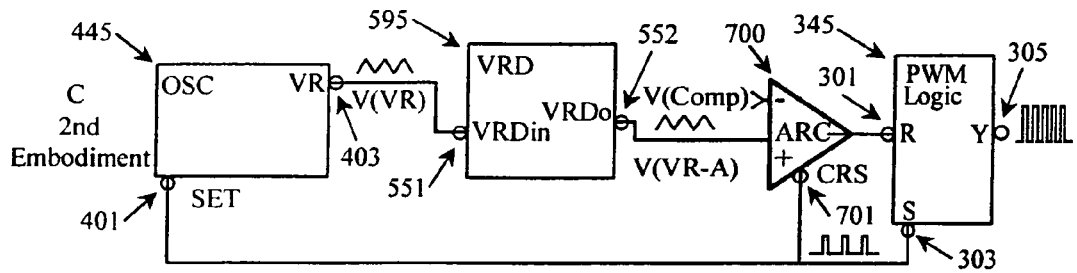

In FIG. 9C another ARS-PWM (3) sub-circuit (system) version is provided, as subject of this invention, comprising four functional blocks, respectively a classic two signal outputs SET (401) and VR (403) oscillator OSC (445) block, a classic one input VRDin (551)—one output VRDo (552) voltage ramp driver VRD (595) block, a three inputs, inverting, non-inverting and CRS (701)—one output analog reset comparator ARC (700) block and a classic two inputs (R, S) one output (Y) pulse width modulation logic PWM Logic (345) block.

As FIG. 9C shows, in this system configuration, only the ARC (700) block requests the implementation of the Analog Reset method.

The system presented in FIG. 9C works similar to the previous one presented in FIG. 9B and has the same very good performances (Ton min <40 nS, D/C<0.5%).

The 3' ARS PWM Sub-Circuit Embodiment

Figure 9D:
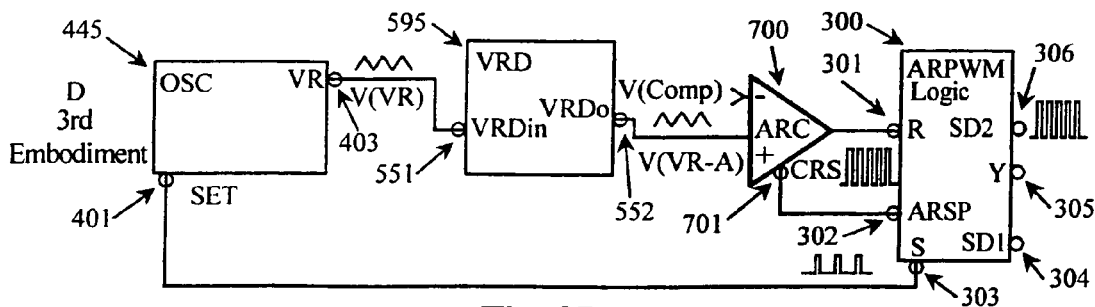

In FIG. 9D another ARS-PWM (3) sub-circuit (system) embodiment version is provided, as subject of this invention, comprising four functional blocks, respectively a classic two signal outputs SET (401) and VR (403) oscillator OSC (445) block, a classic one input VRDin (551)—one output VRDo (552) voltage ramp driver VRD (595) block, a three inputs, inverting, non-inverting and CRS (701)—one output analog reset comparator ARC (700) block and a analog reset four inputs R (301), S (303), SD1 (304), SD2 (306), two outputs ARSP (302), Y (305) analog reset pulse width modulation logic AR-PWM Logic (300) block.

As FIG. 9D shows, in this system configuration, only the ARC (700) and the AR-PWM Logic blocks request the implementation of the Analog Reset method.

FIG. 15A-E illustrates the shape of the most significant PWM circuit's signals delivered in FIG. 9C, respectively "V(SET)", "V(VR)", "V(Comp)", "V(VR-A)", "V(RES-B)" and "V(DRV-B)".

The system presented in FIG. 9C works similar to the previous one presented in FIG. 9B and has the same very good performances (Ton min <40 nS, D/C<0.5%).

The 4$^{th}$ ARS PWM Sub-Circuit Embodiment

Figure 9E:
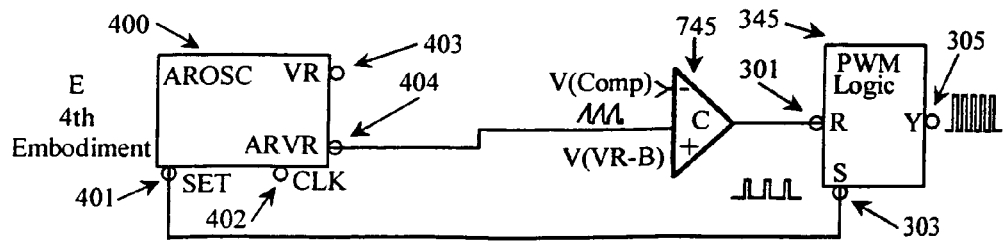

In FIG. 9E another ARS-PWM (3) sub-circuit (system) embodiment version is provided, as subject of this invention, comprising three functional blocks, respectively a four signal outputs SET (401), CLK (402), VR (403) and ARVR (404) analog reset oscillator AR-OSC (400) block a classic two inputs—one output comparator C (745) block and a classic two inputs (R, S)—one output (Y) pulse width modulation logic PWM Logic (345) block.

As FIG. 9E shows, in this system configuration, only the AR-OSC (400) block requests the implementation of the Analog Reset method.

FIG. 15A-E illustrates the shape of the most significant PWM circuit's signals delivered in FIG. 9C, respectively "V(SET)", "V(Comp)", "V(VR-B)", "V(RES-B)" and "V(DRV-B)"

The system presented in FIG. 9C works similar to the previous one presented in FIG. 9B and has the same very good performances (Ton min <40 μS, D/C<0.5%).

Conclusions

By applying the Analog Reset Method in a Mixed Signal Circuit, the operating rate of the entire system is improved up to the digital devices switching speed.

By applying the Analog Reset Method to a classic, low speed/low cost PWM 50 kHz circuit, the minimum driving pulse time can be reduced about 60 times (0.04 μS vs. 2.5 μS) and the minimum duty cycle can be reduced about 20 times (0.5% vs. 10%), without a significant increase of the total cost.

Four different AR-PWM (3) System Embodiments have been provided, as subjects of these inventions. Each of them has some particularly advantages in respect to the implementation's cost, complexity of design, accuracy of control and versatility and compatibility of operations.

The 1$^{st}$ AR-PWM (3) System Embodiment configuration presented in FIG. 9B can be very easy implemented, however it request three extra parts, a CLK extra signal from the oscillator and a SET signal having a minimum 3 μS (for a low speed comparator) ON time.

The 2$^{nd}$ AR-PWM (3) System Embodiment presented in FIG. 9C is able to use three classic functional blocks, however the ARC (700) comparator block requests significant modifications and a SET signal having a minimum 3 μS (for a low speed comparator) ON time.

The 3rd AR-PWM (3) System Embodiment presented in FIG. 9D does not request a SET signal having a minimum 3 μS (for a low speed comparator) ON time however it still include an ARC (700) comparator block comprising a fast and low noise switch.

The 4$^{th}$ AR-PWM (3) System Embodiment presented in FIG. 9D is apparently the ideal one, having just three functional blocks, however it request a very good calibration of the Comp signal in respect to the oscillators' analog reset voltage ramp signal.

The AR-VRD Block

General Description

AR-VRD (550), the system's voltage ramp driver block is also supplied by Vref1 (251) in respect to the internal ground 0 v (109) and has three signal I/O electrodes: a voltage ramp driver VRDin (551) input electrode, a voltage ramp driver VRDo (552) output electrode, and driver analog reset DARin (553) input electrode.

Figure 10A:
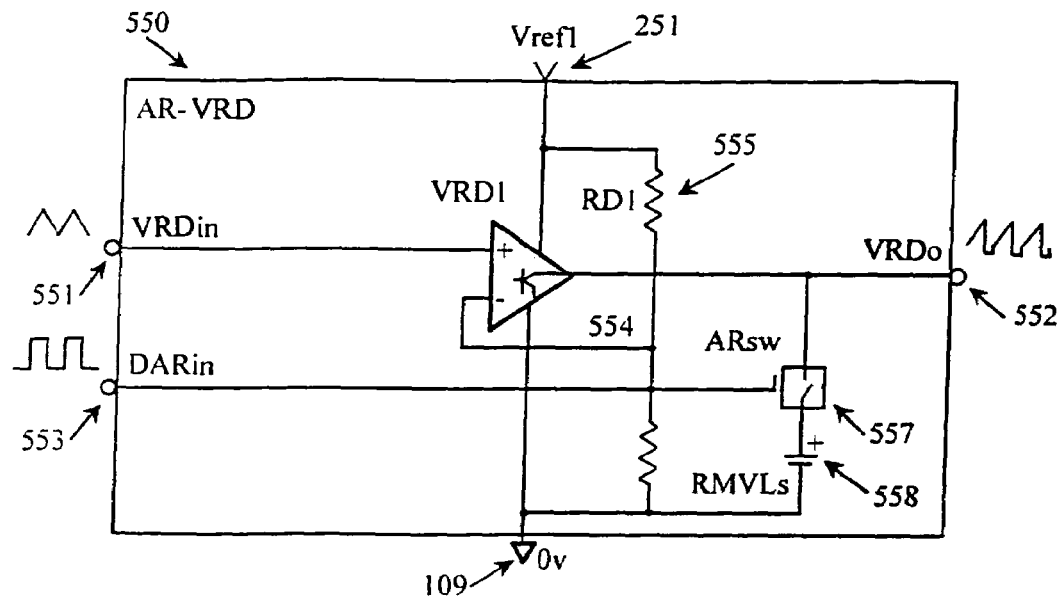
FIG. 10A-B is a NEWCTRL sub-circuit schematic diagram including a $1^{st}$ and $2^{nd}$ embodiment versions of its "AR-VRD" functional block.

FIG. 10A shows a first analog reset voltage ramp driver AR-VRD (550) embodiment version, as subject of this invention, containing a sink-only operational amplifier VRD1 (554), a first driver resistor Rd1 (555), a second driving resistor Rd2 (556), a three terminals (one for control) analog reset switch ARsw (557), and a reset minim voltage level source RMVLs (558)

VRD1 (554), supplied by Vref1 (251) in respect to 0 v (109) has its non-inverting coupled to VRDin (551) and its inverting input together with its output coupled directly to VRDo (552), via Rd (555) coupled to Vref1 (251) and via Rd2 (556) coupled to 0 v (109). RMVLs (558) has its negative pole coupled to 0 v (109) and its positive pole coupled to VRDo (552) via the ARsw (557) switch. The ARsw (557) controlling input is coupled to DARin (553).

As further embedded herein, VRD1 (554) acts as a current buffer (voltage follower) for the voltage ramp signal incoming at VRDin (551), in order to protect the oscillator block for eventually distortions and/or alterations of its generating signal. The resistive divider Rd1 (555), Rd2 (556) adjusts to convenient lower lever the voltage ramp signal outputted trough VRDo (552).

The analog reset switch ARsw (557) transforms the Voltage Ramp (VR) signal into an Analog Reset Voltage Ramp (ARVR) signal, respectively by the means of a synchronized controlling signal inputted at DARin (553), the analog reset switch ARsw (557) keeps the output signal voltage level near 0 v (reset) during the time when the voltage ramp input signal decrease from it maximum value to its initial value only (see the OSC Timing Diagrams FIG. 20D).

The reset minim voltage level source RMVLs (558) helps for maintaining the ARVR signal's lower edge at a convenient level above 0 v, in order to avoid a "non-stop" NEWCTRL (100) output driving pulse, since in a real circuit situation, the "V(Comp)" signal's lower level, applied to the inverting input of the PWM comparator is not a firm 0 v, but about 0.1-0.2 v.

The 2$^{nd}$ AR-VRD Embodiment

FIG. 10A shows a second analog reset voltage ramp driver AR-VRD (550) embodiment version, as subject of this invention, containing a PNP transistor VRD2 (561), a first voltage ramp resistor Rvr1 (564), ), a second voltage ramp resistor Rvr1 (562), ), a third voltage ramp resistor Rvr1 (563), a fourth voltage ramp resistor Rvr1 (567), an analog reset diode Dar (565) and a noise rejection capacitor Cdar (566).

VRD2 (561) has collector coupled to Vref1 (251), its base coupled to VRDin (551) via Rvr1 (564) and its emitter coupled to VRDo (552) via Rvr2 (562). Rvr3 (563) is coupled from VRDo (552) to 0 v (109), Rvr4 is coupled from Vref1 (251) to VRDo (552), Dar (565) is coupled with its anode to the VRD2 (561) base and its cathode to DARin (553).

Cdar (566) is coupled from 0 v (109) to the anode of Dar (565).

As further embedded herein, VRD2 (561) acts as a current buffer (voltage follower) for the voltage ramp signal incoming at VRDin (551), in order to protect the oscillator block for eventually distortions and/or alterations of its generating signal.

The resistive divider Rvr2 (562), Rvr3 (563) adjusts to convenient lower lever the voltage ramp signal outputted trough VRDo (552).

The analog reset diode Dar (565) transforms the Voltage Ramp (VR) signal into an Analog Reset Voltage Ramp (ARVR) signal, respectively by the means of a synchronized controlling signal inputted at DARin (553), the analog reset diode Dar (565) keeps VRD2 (561) base and implicitly the output signal voltage level near 0 v (reset) during the time when the voltage ramp input signal decrease from it maximum value to its initial value only (see the OSC Timing Diagrams FIG. 10D.

Rvr4 (567) helps for maintaining the ARVR signal's lower edge outputted at VRDo (552) at a convenient level above 0 v, in order to avoid a "non-stop" NEWCTRL (100) output driving pulse, since in a real circuit situation, the "V(Comp)" signal's lower level, applied to the inverting input of the PWM comparator is not a firm 0 v, but about 0.1-0.2 v.

The capacitor Cdar (566) integrates a short spike (noise) created when the signal inputted at DARin (553) gets HIGH because of the Dar (565) parasite capacitance.

Design and Implementation

Figure 10B:
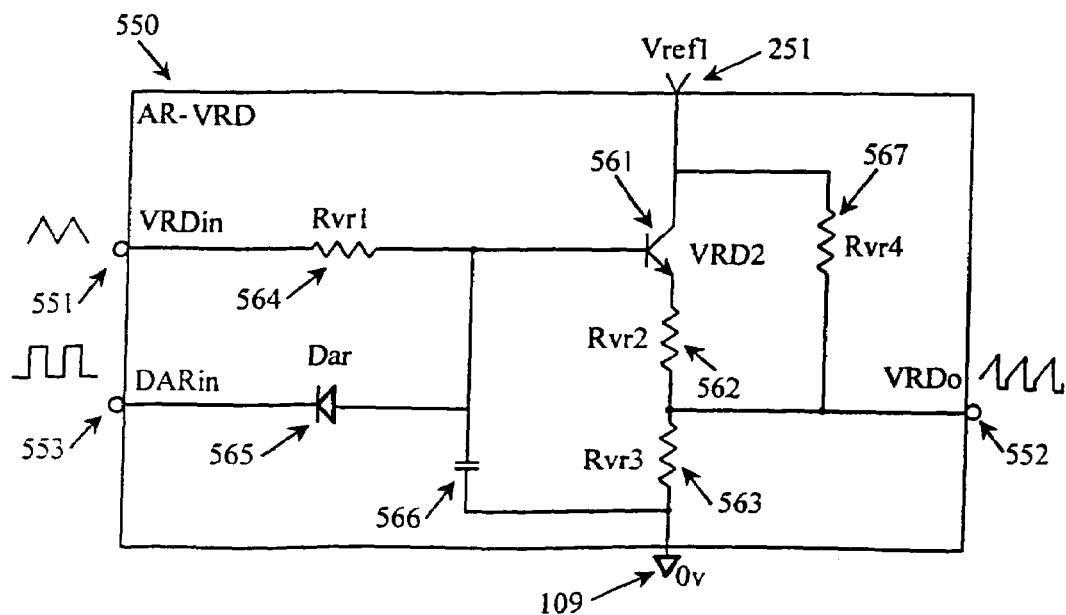

A complete PWM System computer simulation design project, including a AR-VRD circuit similar to the one illustrated in FIG. 10B, has been fully described.

Conclusions

The implementation of the Analog Reset Method in a classic Voltage Ramp Driver circuit is simple, provides considerable flexibility in design and parts selection and does not request expensive extra parts for obtaining its specific signals such as ARVR.

The AR-PWM Logic Block

General Presentation

AR-PWM Logic (300), the system's pulse with modulation logic block is also supplied by Vref1 (251) in respect to the internal ground 0 v (109) and has four signal output electrodes: a reset R (301) input electrode, a analog reset sync pulse ARSP (302) output electrode, a set S (303) input electrode, a first shut down SD1 (304) protection input electrode, a logic Y (305) output electrode and a second shut down SD2 (306) protection input electrode.

The 1$^{st}$ AR-PWM Logic Block Embodiment

Figure 11A:
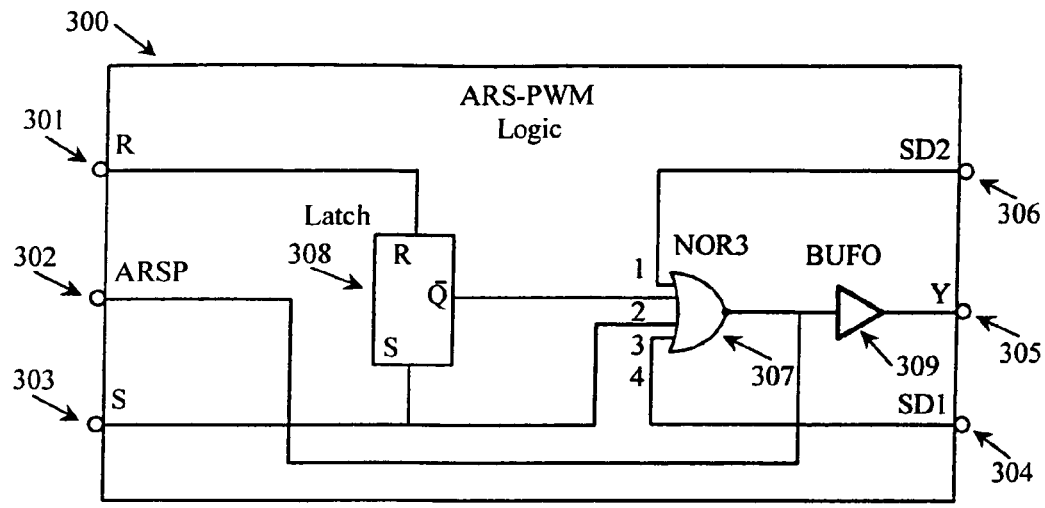
FIGS. 11A-B is a NEWCTRL sub-circuit schematic diagram including a $1^{st}$ and $2^{nd}$ embodiment versions of the AR-PWM Logic" functional block.

FIG. 11A shows a first analog reset pulse with modulation logic AR-PWM Logic (300) embodiment version, as subject of this invention, containing a four inputs one output NOR3 (307) logic gate, a two inputs one output RS logic Latch (308) which uses only its Q-bar (inverted) output, and a current buffer BUFo (309).

The four inputs NOR3 (307), has its first input coupled to SD2 (306), its second input coupled to the Q (bar) output of the Latch (308), its third input coupled to the Latch (308) S input and its fourth input coupled SD1 (304). The NOR3 (307) output is coupled directly to ARSP (302) and via BUFo (309) to Y (305). The Latch (308) has its reset R input coupled to R (301) and its set S input coupled to S (303).

As further embedded herein, the AR-PWM Logic (300) block, provides an output signal at Y (305) function of the momentary voltage level provided to its inputs electrodes, as long as the voltage amount inputted to its two protection inputs SD1 (304) and SD2 (306), remains at the LOW logic level. If at least one of this protection inputs is switches HIGH, than the Y (305) output switches LOW.

For obtaining the necessarily analog reset sync pulse outputted at ARSP (302) there is no need for extra parts included into AR-PWM Logic (300), but just an extra connection wire from the NOR3 (307) output to the ARSP (302) electrode. The same driving signal delivered trough Y (305) can be delivered to the ARC (700) block trough the ARSP (302) electrode.

The 2$^{nd}$ AR-PWM Logic Block Embodiment

Figure 11B:
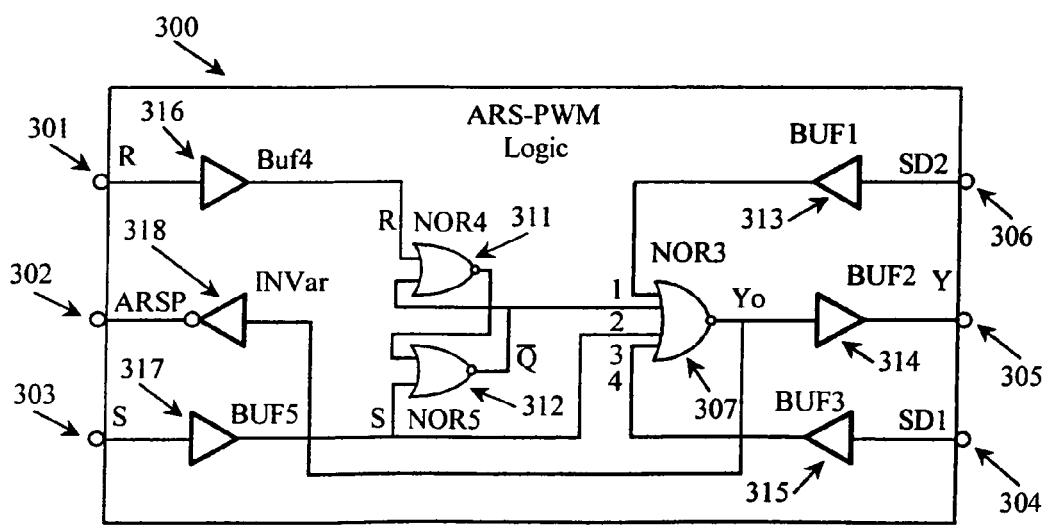

FIG. 11B shows a second analog reset pulse with modulation logic AR-PWM Logic (300) embodiment version, as subject of this invention, containing a four inputs one output NOR3 (307) logic gate, a two inputs one output RS logic Latch including two NOR gates NOR4 (311) and NOR5 312 which uses only its Q-bar (inverting) output, five current buffers BUF1 (313), BUF2 (314), BUF3 (315), BUF4 (316), BUF5 (317), and an inverting buffer INVar (318).

BUF1 (313) input is coupled to SD2 (306) and its output is coupled to the first input of NOR3 (307). BUF2 (314) output is coupled to Y (305) and its input is coupled to the NOR3 (307) output. BUF3 (315) input is coupled to SD1 (304) and its output coupled to the fourth input of NOR3 (307). BUF4 (316) input is coupled to R (301) and its output coupled to one input of NOR4 (311). The other input of NOR 4 (311) together with the NOR5 (312) output are coupled to the second input of NOR3 (307). The other input of NOR5 (312) is coupled to the third input of NOR3 (307) and to the output of BUF5 (317). The input of BUF5 (317) is coupled to S (303). The output of INVar (318) is coupled to ARSP (302) and its input is coupled to the output of NOR3 (307).

As further embedded herein, the AR-PWM Logic (300) block, provides an output signal at Y (305) function of the momentary voltage level provided to its inputs electrodes as long as the voltage amount inputted to the two protection inputs SD1 (304) and SD2 (306), remains at the LOW logic level. If at least one of this protection inputs is in HIGH logic state, than the Y (305) output is LOW.

The INVar (318) provides, trough ARSP (302) the necessarily synchronized signal to the CARin (701) input of the ARC (700) block, which this time is in opposite phase.

The ARS-PWM Hybrid Controller Circuit Embodiments

General Description

The core of a CPPC PFC Controller Circuit (3) consists in a high performances Voltage Mode PWM circuit, able to deliver a very short (10-100 nS) driving pulse.

Therefore, an ARS-PWM Hybrid Controller Circuit (800) is provided, which is able to resolve this important inconvenient. For the reminder of this description the ARS-PWM Hybrid Controller Circuit (800) may be referred to as an ARS-PWM HCC (800).

In this chapter of the present invention, a high performances Voltage Mode PWM circuit embodiment is achieved by the means of an Open-loop Test Fixture Circuit which comprises all necessarily parts (including a voltage ramp driver for allowing the Voltage Mode of Operations) for testing an ARS-PWM HCC (800), which includes a xx3842 and a few extra parts.

This ARS-PWM HCC (800) represents an immediately evidence of the Analog Rest Method implementation into a classic, low cost, current mode PWM controller external circuit, for obtaining a high performances Voltage Mode PWM circuit, as a final step for achieving a high performance CPPC PCF Controller Circuit (100).

The 1$^{st}$ ARS-PWM Hybrid Controller Embodiments

Figure 1A:
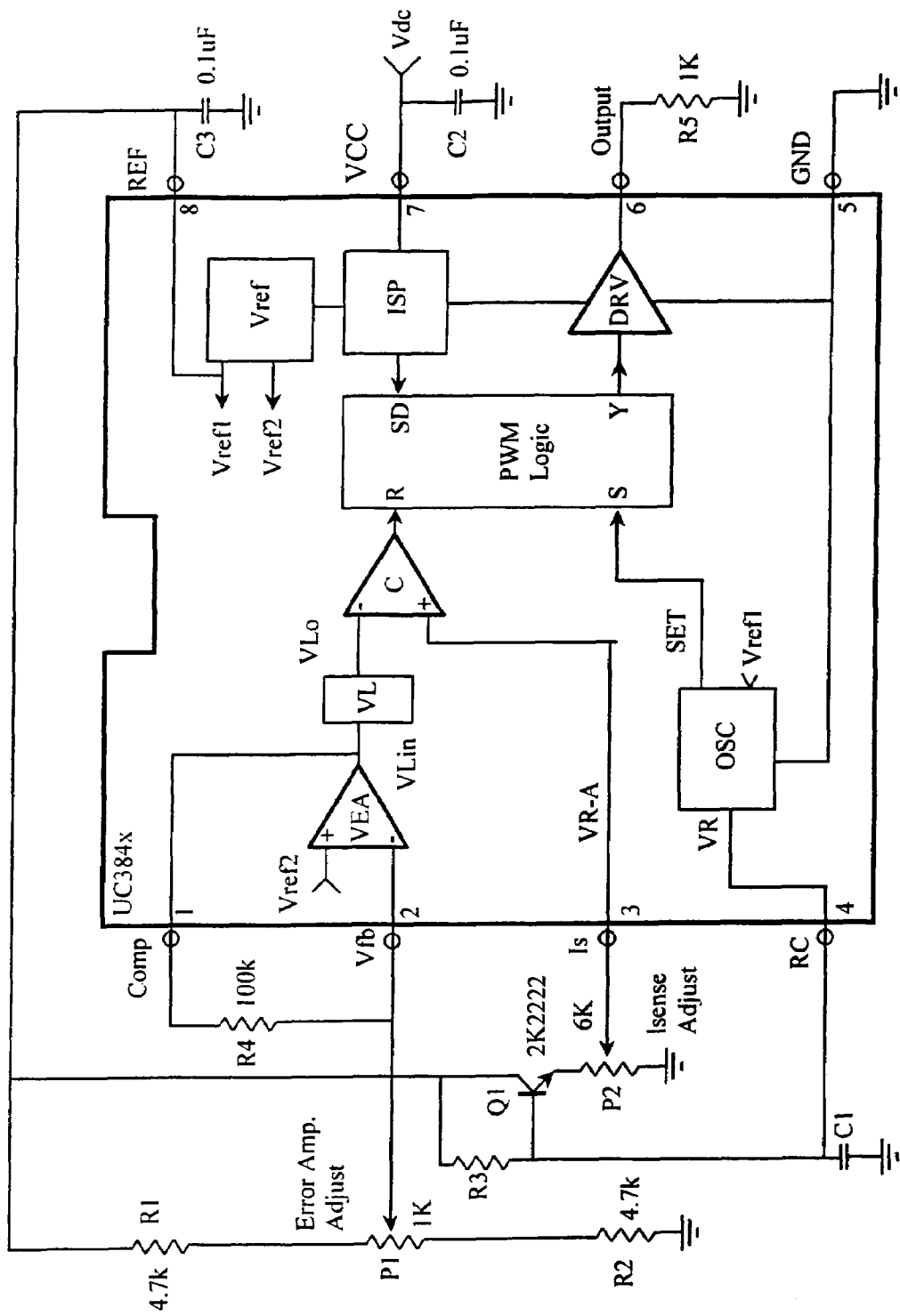
FIG. 1A is a prior art UC384x—Open Loop Laboratory Fixture Circuit.
Figure 1B:
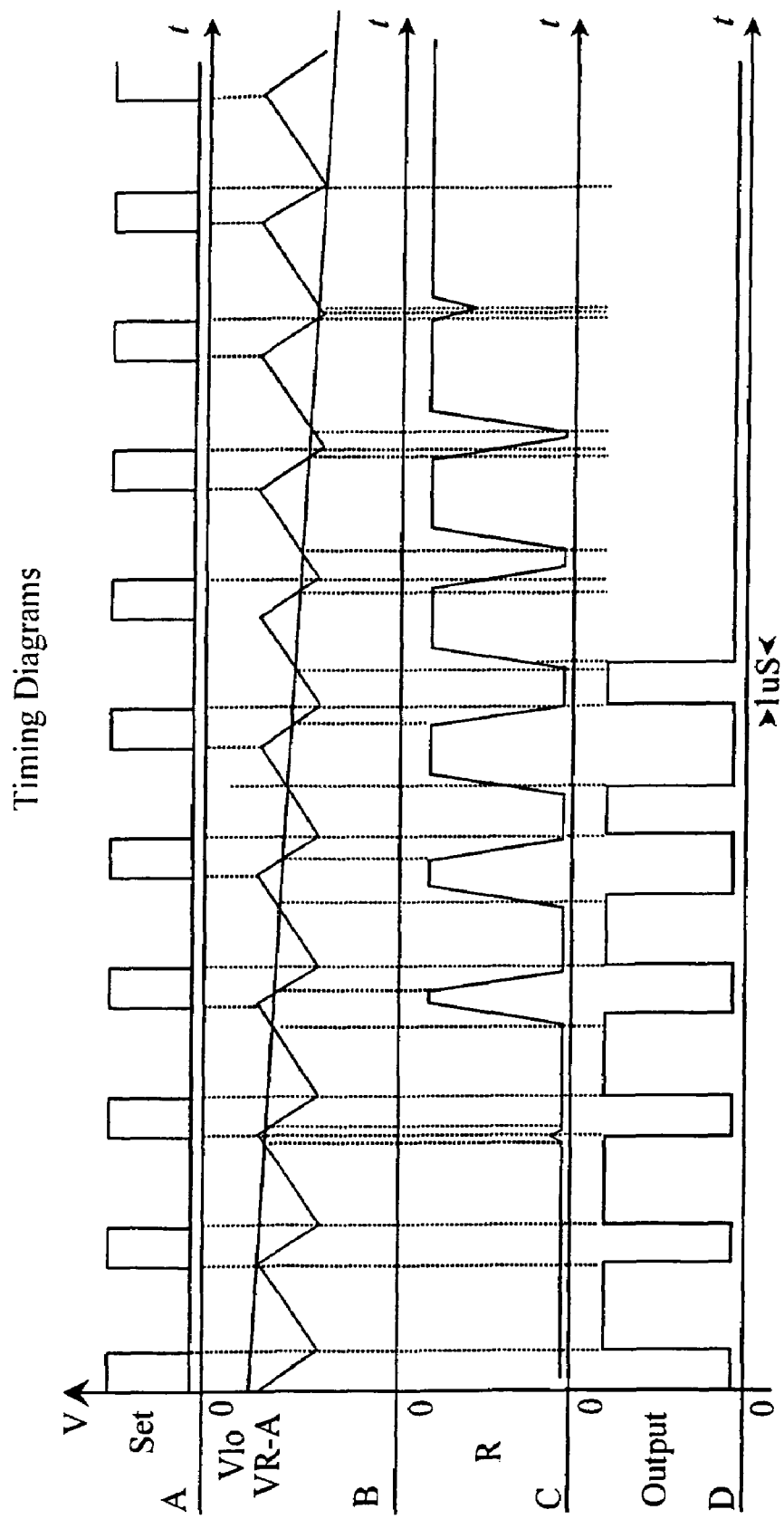
FIG. 1B are Timing Diagrams for the circuit of FIG. 1A.
Figure 2:
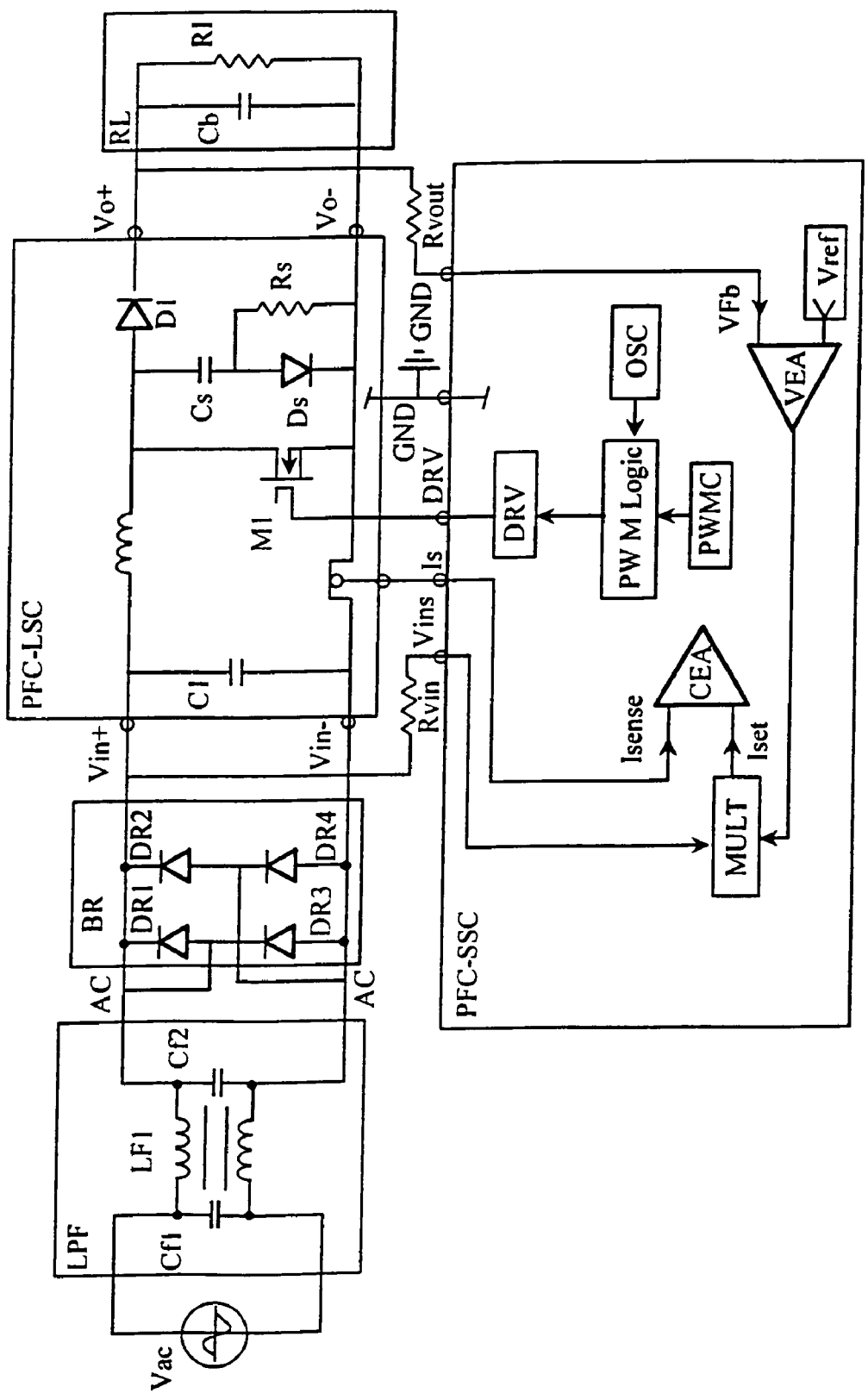
FIG. 2 is a prior art Classic Power Factor Correction Circuit including an AC generator Vac, a full-wave rectifier bridge BR, a Large Signal Circuit PFC-LSC, a Small Signal Circuit PFC-SSC and a Complex Load Circuit CL.

FIG. 12A shows an Open Loop Laboratory Fixture, identical (with respect to the parts attributes) to the one presented above at FIG. 1A of the related art section, for a comparison test of the ARS-PWM HCC (800), as subject of this invention, and a classic UC3842 device.

One terminal of Rar (831) is coupled to Out (806) and the other terminal is coupled to the cathode of Zar (832) and to the cathode of Dar (833). The anode of Dar (833) is coupled to Is (803) and to one terminal of Cdar (834). The other terminal of Cdar (834) and the anode of Zar (832) are coupled together to GND (805).

Externally to the ARS-PWM HCC (800), there is a test fixture circuit, similarly to the one described in the related art section, comprising a first error amplifier resistor Rea1 (811) an error amplifier voltage level adjuster potentiometer P1 (812), a compensation resistor Rp (813), a second error amplifier resistor Rea2 (814), an oscillator timing resistor Rt (815), an oscillator timing capacitor Ct (816), a voltage ramp driver transistor Qvr (817), an Isense (i.e. max duty cycle) adjuster potentiometer P2 (818), a Vref filtrating capacitor Cvref (819), a Vdc filtrating capacitor Cvdc (820), a drive pulse load resistor Rdrv (821) and a voltage DC source Vdc (822).

Rea1 (811), is coupled between Vref (808) and one terminal of P1 (812). The middle connection of P1 (812) is coupled directly to FB (802) and via Rcomp (813) to Comp (801). The other terminal of P1 (812) is coupled to GND (60) via Rea2 (814). Rt (815) has one terminal coupled to Vref (808) and the other one coupled simultaneously to the base of Qvr (817), RC (804) and one terminal of Ct (816). The other terminal of Ct (816) is coupled to GND (60). Qvr (817) has its collector coupled to Vref (808) and its emitter coupled to GND (60) via P2 (818). The middle connection of P2 (818) is coupled to Is (803). Vref (808) is coupled to GND (60) via Cvref (819), Vcc (807) is coupled to GND (60) via Cvdc (820), Out (806) is coupled to GND (60) via Rdrv (821) and GND (805) is coupled directly to GND (60).

Vdc (822) has its positive pole coupled to Vcc (807) and its negative pole to GND (60).

The 2$^{nd}$ ARS-PWM Hybrid Controller Embodiments

FIG. 12B shows a second ARS-PWM HCC (800) embodiment version. The same Open Loop Laboratory Fixture circuit presented in FIG. 12A is used for a comparison test of this new ARS_PWM HCC (800), as subject of this invention, and a classic 3842 device.

One terminal of Rar1 (841) is coupled to Out (806) and the other terminal is coupled to the base of Qar1 (842). Qar1 (842) has its emitter coupled to GND (805) and its collector coupled to the base of Qar2 (844) and one terminal of Rar2 (843). The other terminal of Rar2 (843) is coupled to Vref (808). Qar2 (844) has its emitter coupled to GND (805) and its collector coupled to Is (803).

Externally to the ARS-PWM HCC (800), the same test fixture circuit illustrated in FIG. 12A is used for comparison test to the classic xx3842 device.

In other words, the ARS-PWM HCC (800) version from FIG. 12B replaces, pin by pin, the ARS-PWM (800) Hybrid Controller Circuit version from FIG. 12A.

The 3$^{rd}$ ARS-PWM Hybrid Controller Embodiments

FIG. 12C shows a third ARS-PWM HCC (800) embodiment version. The same Open Loop Laboratory Fixture circuit presented in FIG. 12A is used for a comparison test of this new ARS-PWM HCC (800), as subject of this invention, and a classic 3842 device.

Externally to the ARS-PWM HCC (800) the same test fixture circuit illustrated in FIG. 12A is used for comparison test to the classic UC3842 device.

In other words, the ARS-PWM HCC (800) version from FIG. 12C replaces, pin by pin, the ARS-PWM HCC (800) version from FIG. 12A.

Figure 13:
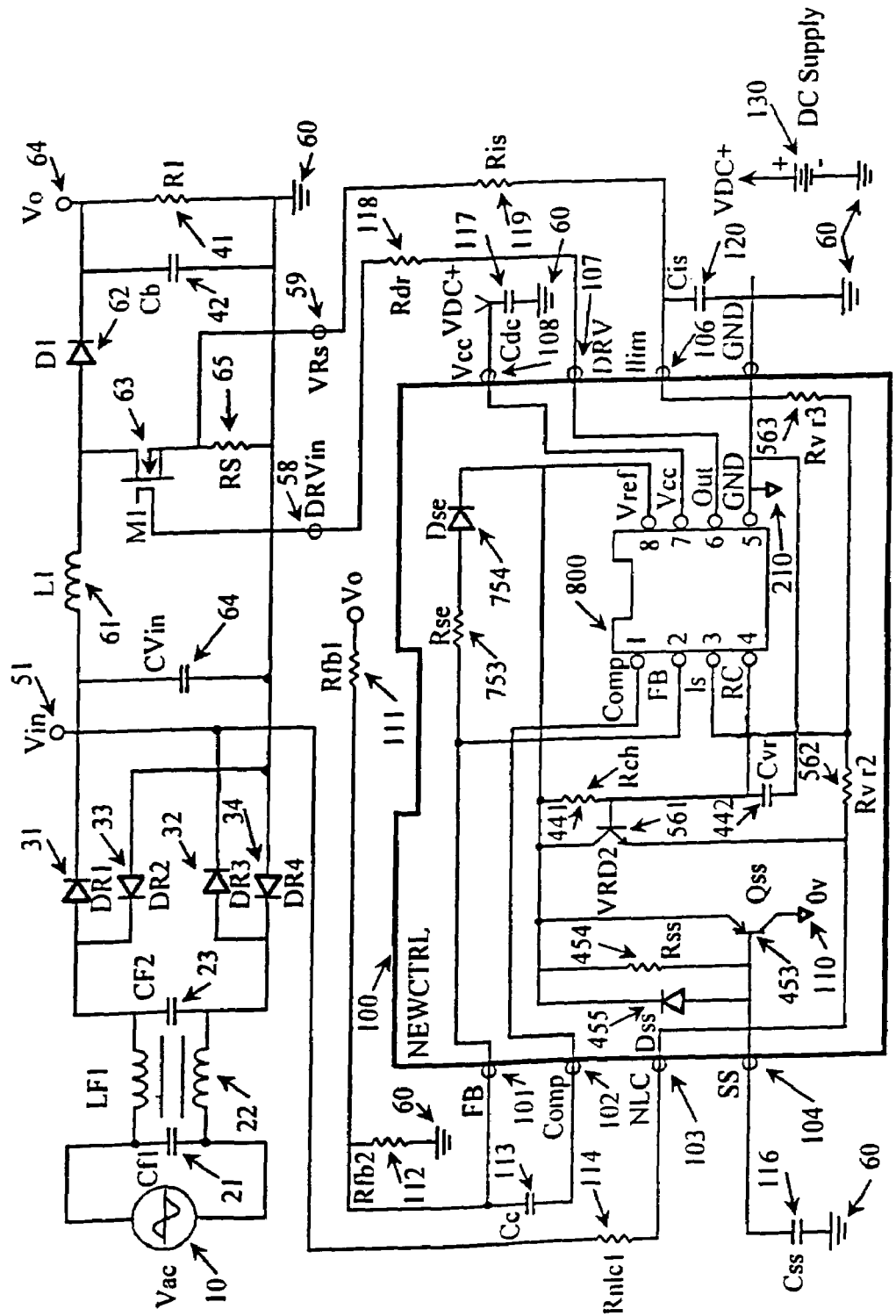
FIG. 13 is a LCHPPFCS Apparatus Embodiment's schematic diagram.

In accordance with the present invention, in FIG. 13 a CPPC PFC-LSC (2) Apparatus Embodiment is provided as an important LCHPPFCS (1) sub-circuit.

The CPPC PFC-LSC (2) includes, in this embodiment's version, an alternative current Voltage generator Vac (10), a Low (frequency) Pass Filter block LPF (20), a Bridge Rectifier block BR (30), a Complex Load block CL (40) and a generic Boost CPPC PFC-LSC.

The Vac (10) is a low frequency (50-60 Hz) high voltage (90-240 Vrms) sine wave voltage generators which provides a full rectified AC voltage to CPPC PFC-LSC (2), through the LPF (20), comprising two filtrating capacitor Cf1 (21) and Cf2 (23) flanking a symmetrical double coil Lf1 (22) and also trough the BR (30), comprising four rectifier diodes DR1 (31), DR2 (32), DR3 (33) and DR4 (34).

The CL (40), comprising a resistive load R1 (41) across to a bulk (100-470 μF) capacitor Cb (42), is supplied by (and/or trough) the Boost CPPC PFC-LSC (2) block.

The Boost CPPC PFC-LSC (2), as embodied herein, is a complex functional block having six I/O electrodes, respectively two large signal input electrodes Vin+ (51), Vin− (52), two large signal output power electrodes Vo− (53), Vo+ (54) and two small signal electrodes such as DRVin (58) and VRs (59).

Internally, the generic boost CPPC PFC-LSC (2) block, as embodied herein, contains a two terminals oscillating coil L1 (61), a high power fast (30-500 kHz) rectifier diode D1 (62), a high power high frequency (30-500 kHz) MOSFET transistor M1 (63), a sense resistor Rs (65) and a capacitor CVin (64).

The coil L1 (61) has one terminal coupled to Vin+ (51) and the other one coupled to the anode of D1 (62). The cathode of D1 (62) is coupled to Vo+ (54). M1 (63) has its drain electrode coupled to the anode of D1 (62), its source electrode to Vin− (52) via Rs (65) and its gate electrode coupled to DRVin (58). CVin (64) is coupled across Vin+ (51) and Vin− (52). Vin− (52) is coupled to Vo− (53) and is also coupled to the system's ground GND (60).

The BR (30) has its AC input coupled to the LPF (20) output, its positive output coupled to Vin+ (51) and its negative output to Vin− (52)

The CL (40) is coupled across the two output electrodes, Vo+ (54) and Vo− (53).

The CPPC PFC-SSC

A CPPC PFC SSC (3), as a complementary sub-circuit for the CPPC PFC LSC (2), in respect to the entire LCHPPFCS (1) is also provided in FIG. 13, including a constant pulse proportional current power factor correction controller circuit CPPC PCF CC and a controller's related circuit, CRC (110). The CPPC PCF CC may be referred to as NEWCTRL (3).

The Controller Circuit

The figures suggest that the NEWCTRL (3) improves the power factor in this circuit and the positions of the various terminals denote the function of each of them. In other words, in a NEWCTRL (3) schematic diagram, the internal architecture and the positions of the terminals will illustrate, alone, the particular function of each terminal.

As farther embedded herein, the NEWCTRL (3), subject of this invention, is a Complex Mixed Signal System connected to the rest of the LCHPPFCS (1) via eight I/O electrodes: a feedback electrode FB (101) a compensation electrode (102), a non-linearity correction electrode NLC (103), a soft start electrode SS (104), a ground electrode GND (105), a current limiter electrode Ilim (106), a gate driving electrode DRV (107) and a supply electrode VCC (108). A zero voltage internal connection 0 v (109) serving as internal ground is connected to the GND (105) electrode.

Internally the NEWCTRL (3) contains oscillating charging resistor Rch (441), an oscillating and voltage ramp provider capacitor (442), a voltage ramp driver NPN transistor VRD2 (561), a first voltage drive resistor Rvrd2 (562), a second voltage ramp resistor Rvr3 (563), a soft start PNP transistor Qss (453), a soft start resistor Rss (454), a soft start diode Dss (455), a start enforcer resistor Rse (753), a start enforcer diode Rse (754) and an AR-PWM (800), sub-circuit.

The AR-PWM (800) has its $1^{st}$ terminal "Comp" coupled to Comp (102), its $2^{nd}$ terminal coupled to FB (101), its $3^{rd}$ terminal "Is" coupled to HVC via Rvr2 (562) and to Ilim (106) via Rvr3 (563), its $4^{th}$ terminal coupled to Vref ($8^{th}$ terminal) via Rch (441) and to 0 v (109) via Cvr (442), its $5^{th}$ terminal GND coupled to 0 v (109) and to GND (60), its $6^{th}$ terminal Output coupled to DRV (107) its $7^{th}$ terminal Vcc coupled to Vcc (108) and its $8^{th}$ terminal Vref coupled (besides Rch (441) which has been mentioned already), to the cathode of Dse (754), collector of VRD2 (561), one terminal of Rss (454) and cathode of Dss (455). The anode of Dse (754) is coupled to FB (101) via Rse (753). The NPN transistor VRD2 (561) has its base coupled to RC (the $4^{th}$ terminal of ARS-PWM (800) and its emitter coupled to HVC (103). The other terminal of the Rse (454) is coupled to the base of Qss (453), to the anode of Dss (455) and to SS (104). The Qss (453) emitter is coupled to Comp (102) and its collector is coupled to 0 v (109).

In respect to the block schematic diagram of the NEWCTRL (3) internal circuit presented in FIG. 5 and the ARS PWM HCC (800) Embodiments presented in FIGS. 9A-E, the AR-PWM (800) sub-circuit comprises the following functional blocks: ISP (150), DR (200), Vref (250), PWM-Logic (345), OSC (445), VEA (600), VL (650) and C (745).

By the means of one of the AR sub-circuits illustrated in FIGS. 12A-C and fully described above, the classic UC3842 (830) pulse width modulation comparator C (745) has been forced to perform as an ARC (700), fact which guarantees a very short ON driving pulse, when is needed (by resetting periodically its "Is" input).

The SS (450) block is represented by a circuit (presented in FIG. 7 and described above) comprising Qss (453) Rss (454) and Dss (455), the SE (750) block is represented by a circuit (presented in FIG. 7 and described above) comprising Rse (753) and Dse (754) and the VRD (595) block is represented by a classic voltage ramp driving circuit comprising VRD2 (551), Rvr2 (552) and Rvr3 (553).

The current limiter comparator block CL (350) is overlapping with the ARC (700) block, and the non-linearity correction block NLC (500) is overlapping with the VRD (595) block.

The Controller's Related Circuit

The Controller Related Circuit (110) includes typically just the small signal devices direct connected to the NEWCTRL (3), most of them fully described (FIG. 5).

In this embodiment it is assumed that there is an available 16-20V DC voltage source VDC (121) for supplying the NEWCTRL (3) circuit.

As FIG. 13 shows, externally to the NEWCTRL (3), the controller related circuit CRC (110) includes a first feedback resistor Rfb1 (111), a second feedback resistor Rfb2 (112), a compensation capacitor Cc (113), a first non linearity correction resistor Rnlc1 (114), a soft start capacitor Css (116), a supply filtrating capacitor Vdc (117), a driving resistor Rdr (118), a current sense limiting resistor Ris (119), a current sense signal filtrating capacitor Cis (120) and a direct current voltage source VDC (121).

The CRC (110) connects the NEWCTRL (3) with the rest of the circuit as following:

The FB (101) electrode is coupled to Vo+ (54) via Rfb1 (111), to GND (60) via Rfb2 (112) and to Comp (102), via Cc (113). The HVC (103) electrode is coupled to Vin+ (51) via Rnlc1 (114). The SS (104) electrode is coupled to GND (60) via Css (116). The GND (105) electrode is coupled to GND (60). The Ilim (106) electrode is coupled to Vrs (59) via Ris (119) and to GND (60) via Cis (120). The DRV (107) electrode is coupled to DRVin (58) via Rdr (118). The Vcc (108) electrode is coupled directly to the positive pole of a 16-20V supply source VDC (121) and to GND (60) via Cdc (117). The VDC (121) has its negative pole coupled to GND (60).

Figure 14:
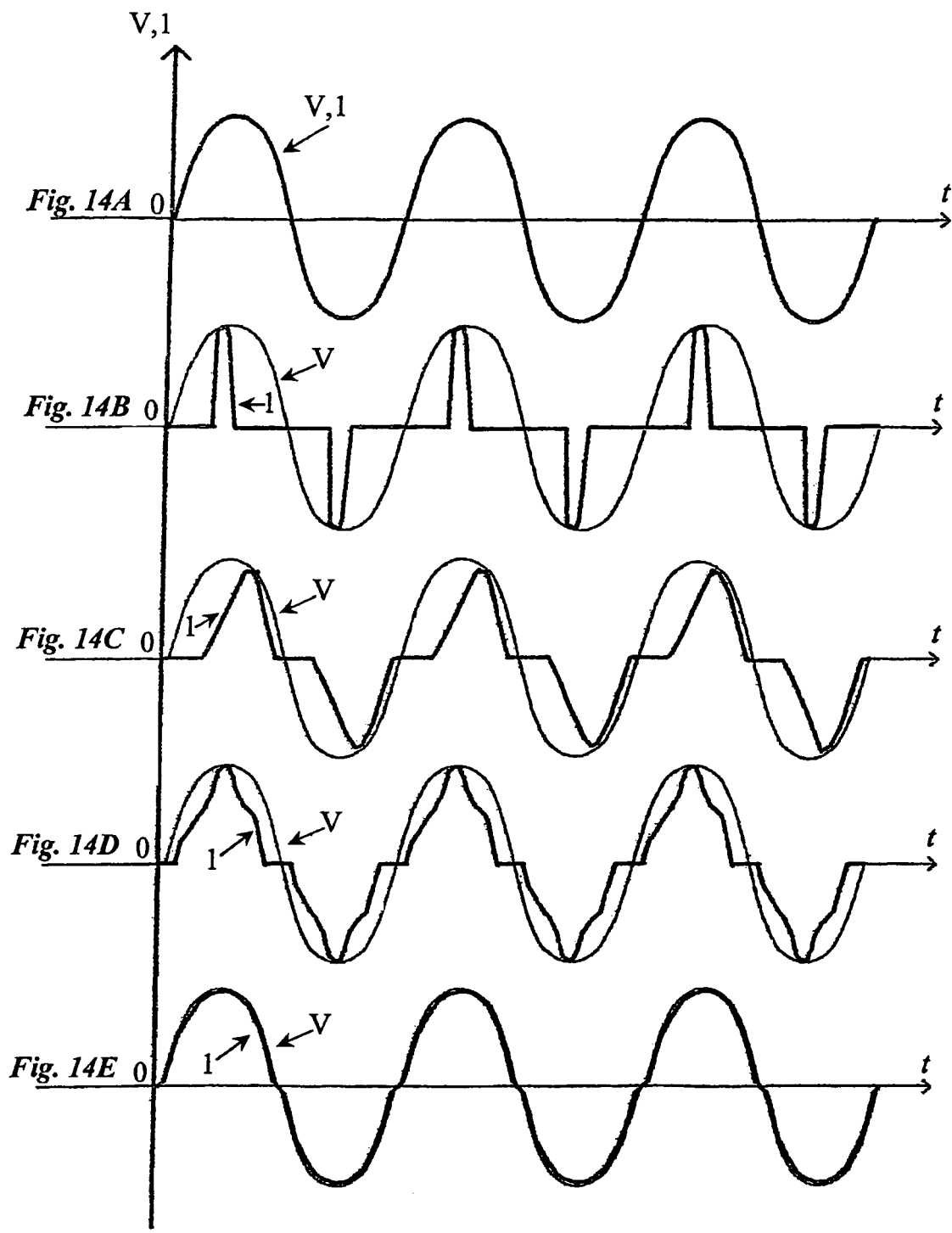
FIGS. 14A-E is a graphic representation for the Vac Generator Voltage and Current Timing Diagrams for resistive and/or complex load circuits.

Eventually, Vcc (108) can be coupled to VDC+ (92) provided by CSC (90), as it has been illustrated in FIG. 14 and described above.

Design and Implementation

The implementation of the Constant Pulse Proportional Current Power Factor Correction method in an AC/DC converter is much simple than any other related art methods (especially the ones involving a Multiplier), providing considerable flexibility in design and parts selection.

Figure 16:
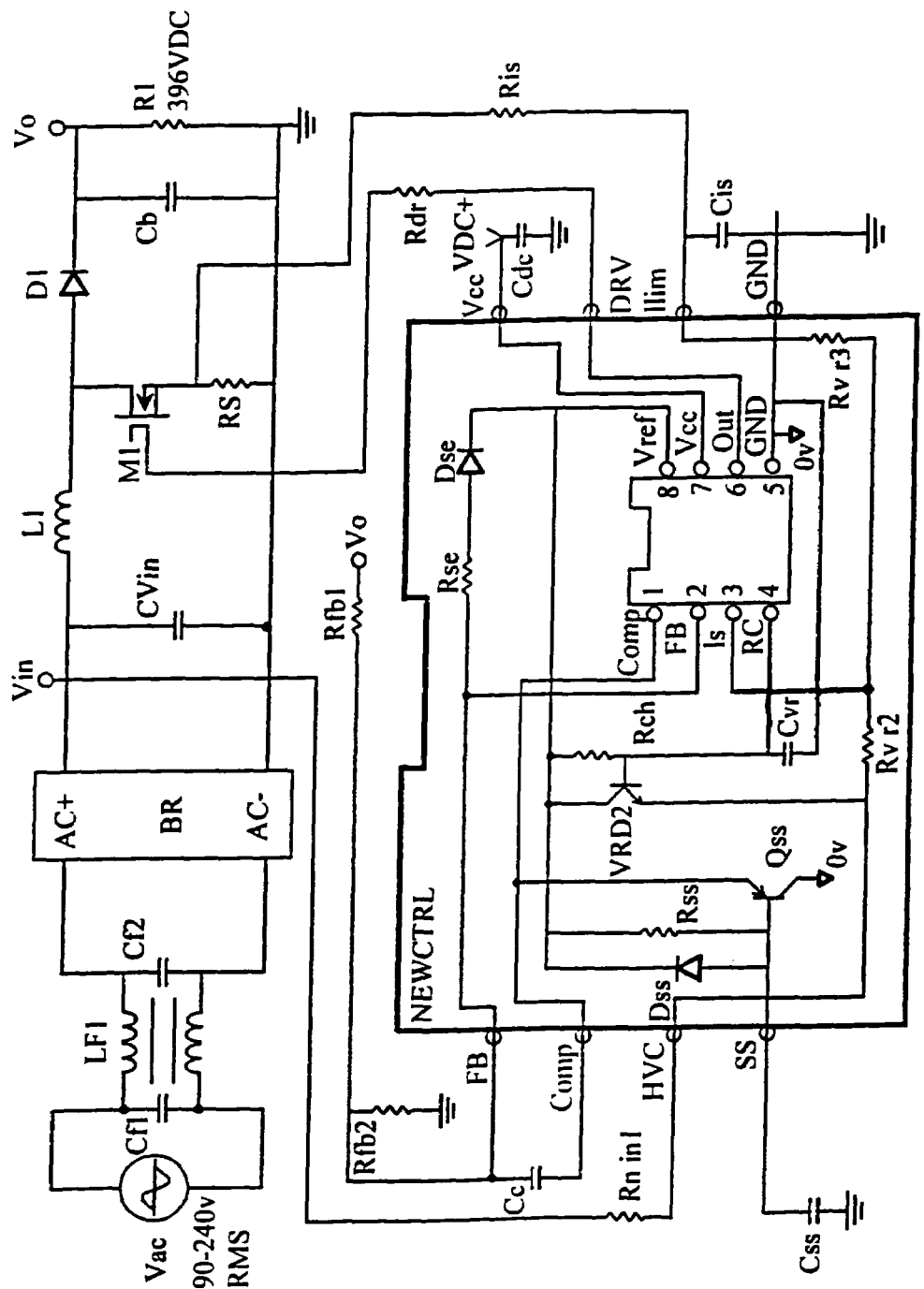
FIG. 16 is a 160w LCHPPFCS Bench Prototype Apparatus' Schematic Diagram, designed for a Test Data performances' evaluation of the Embodiment presented in FIG. 13.

A completed LCHPPFCS (1) apparatus design project is illustrated in FIG. 16, including the prototype schematic diagram (similarly to the one illustrated in FIG. 13).

The invention claimed is:

1. A system for improving the power factor to near unity between a low frequency AC power source and a complex load, the system comprising:

a bridge rectifier circuit having an input disposed to be operatively connected to the AC power source to convert an AC power source voltage signal therefrom into a low frequency fully rectified voltage signal at an output of the bridge rectifier circuit;

a boost converter unit having an input operatively connected to the output of the bridge rectifier circuit to receive and convert the low frequency fully rectified voltage signal into a DC voltage disposed to be applied across the complex load at an output of the boost converter; and a high frequency controller circuit operatively connected between a control input of the boost converter unit and a negative terminal of the output of the boost converter unit includes a pulse width modulation circuit to generate a control signal having trains of pulses, constant in frequency and duty cycle during a time period equal to or longer than one semi-cycle period of the AC power source voltage signal to be provided to the control input of the boost converter unit so a current amount absorbed by the boost converter unit from the AC power source is contingent and linearly proportional to the AC power source voltage signal wherein the pulse width modulation circuit includes a voltage ramp buffer sub-circuit to compare and amplify the control signal to a reference voltage.

2. A system as in claim 1 wherein the boost converter unit comprises:

a capacitive circuit coupled across the output of the bridge rectifier circuit to present a high impedance in respect to the AC power source low frequency supply signal and low impedance in respect to a boost converter high frequency signal;

a high frequency rectifier diode having an anode and a cathode with the cathode coupled to a positive terminal of the output of the boost converter;

an oscillating inductor having a first end coupled to a positive terminal of the output of the bridge rectifier circuit and a second end coupled to the anode of the high frequency rectifier diode, wherein the inductor has associated therewith a charging time and a discharging time; and a controllable power switch circuit with one end coupled to a junction of the second end of the oscillating inductor and the anode of the high frequency rectifier diode and an other end coupled to a negative terminal of the output of the bridge rectifier circuit for periodically charging the oscillating inductor.

3. A system of claim 1 when operating in a voltage control mode said boost converter unit creates a correction signal or plurality of signals from the fully rectified voltage signal or DC voltage across the complex load and adjustment of the duty cycle of the driving signal from the pulse width modulation circuit includes altering a first voltage with a portion of a second voltage and proportionally altering the pulse duty cycle of the driving signal.

4. A system of claim 1 wherein when operating in current control mode said boost converter unit creates a correction voltage signal from a voltage drop across a sense resistor between the power switch and ground or from a voltage drop across a sense resistor to ground between the boost converter unit and a negative terminal of the bridge rectifier circuit;

wherein adjustment of the duty cycle of the driving signal from the pulse width modulation circuit includes altering a first correction voltage with a portion of a second correction voltage and proportionally altering the pulse duty cycle of the driving signal.

5. A system as in claim 1 wherein said pulse width modulation circuit further includes:

a voltage error amplifier sub-circuit coupled to the voltage ramp buffer sub-circuit to receive and amplify the control signal; and an analog reset switching sub-circuit operatively connected to the voltage error amplifier sub-circuit input and voltage ramp buffer sub-circuit output to rapidly decrease a voltage ramp signal to near zero during each clock cycle.

6. A system as in claim 1 where the high frequency controller circuit is a constant pulse proportional current controller circuit.

7. A system as in claim 6 where the control signals are are effectively open loop correction signals comprised of one of the following:

a voltage signal formed by a first resistive divider circuit of the fully rectified signal;

a voltage signal formed by a second resistive divider circuit of the DC voltage across the complex load; and a voltage signal from a sense resistor between the controllable power switch and the negative terminal of the bridge rectifier circuit.

8. A system of claim 7 wherein the high frequency controller circuit is a digital constant pulse proportional current controller circuit comprises:

a digital pulse width modulation circuit to generate the trains of pulses, constant in frequency and duty cycle during a time equal to or longer than one semi-cycle period of the AC power source; and summing nodes for injecting control signal into the pulse width modulator circuit.

9. A system as in claim 7:

wherein the pulse width modulation circuit includes input and output terminals disposed to receive operating voltage, to be connected to ground, to receive control signals and to provide an output driving signal;

the pulse width modulation circuit further comprises:

an internal supply and protection sub-circuit disposed to receive an input voltage to provide a standard voltage to the pulse width modulation sub-circuits and to provide protection and shutdown functions;

a voltage reference sub-circuit disposed to be connected to ground and to provide precision voltage references to other sub-circuits;

a fixed frequency oscillator sub-circuit to generate a set logic output, a reset logic output, a clock logic output, and voltage ramp output signals as synchronizing signals to other sub-circuits;

a voltage limiter sub-circuit having a resistive-diode divider network to limit the compensation voltage and provide a feedback signal to one input of a voltage error amplifier sub-Circuit;

the voltage error amplifier sub-circuit coupled to the voltage limiter sub-circuit and disposed to receive the control signal to amplify the correction signal and cause a pulse width modulation logic sub-circuit to modify the duty cycle of the driving signal to the power switch;

an analog reset switching sub-circuit operatively connected to the voltage error amplifier sub-circuit input and voltage ramp buffer sub-circuit output to rapidly decrease the voltage ramp signal to near zero during each clock cycle;

the pulse width modulation logic sub-circuit having input signals from the fixed frequency oscillator and voltage error amplifier sub-circuits to generate a driving signal with a duty cycle contingent with, and proportional to, the input signals;

a soft start sub-circuit to delay reference voltages and other sub-circuit operations to ensure smooth startup of the pulse width modulator circuit; and a start enforcer sub-circuit to delay operation of the voltage error amplifier sub-circuit at startup to prevent large duty cycles and unsafe startup operation.

10. A system as in claim 9 further comprises an error amplifier comprising:

an input connected to an output of the voltage ramp buffer sub-circuit and connected to the analog reset switching sub-circuit to receive the correction signal;

an input connected to an output of the voltage limiter sub-circuit to receive the correction signal; and an output of the error amplifier sub-circuit is a summing node of the input correction signals from the voltage ramp buffer sub-circuit and the voltage limiter sub-circuit.

11. A system of claim 9 of a voltage ramp buffer sub-circuit comprises:

a first input terminal to receive voltage ramp signals from the fixed frequency oscillator sub-circuit;

a second input terminal to receive an injected open-loop correction input signal;

a third input terminal to receive a voltage reference input signal; and a resistive output forming a summing node and amplifying the oscillator voltage ramp signal with the injected open-loop correction input signal coupled to drive one input of the voltage error amplifier sub-circuit.

12. A system of claim 9 further comprising an analog reset switching sub-circuit to periodically sense the state of the pulse width modulation logic sub-circuit and force the input of the error amplifier sub-circuit from the voltage ramp buffer sub-circuit to zero wherein the pulse width modulation logic sub-circuit is reset to its initial state within one clock cycle of the oscillator sub-circuit the analog reset switching sub-circuit includes:

an input to receive a signal from the pulse width modulation logic sub-circuit output; and a low-side output connected to the input of the voltage error amplifier sub-circuit and to the output of the voltage ramp buffer sub-circuit.

13. A system of claim 6, wherein the high frequency controller circuit is a digital constant pulse proportional current controller circuit comprises:

a digital pulse width modulation circuit to generate the trains of pulses, constant in frequency and duty cycle during a time equal to or longer than one semi-cycle period of the AC power source; and summing nodes for injecting control signal into the pulse width modulator circuit.

14. A power factor correction system of claim 13: further comprises a digital pulse width modulation logic block; and wherein said summing nodes are within a control loop for injecting correction signals into said digital pulse width modulation logic block to modify the duty cycle of the driving pulse signal to the power switch.

15. A power factor correction system of claim 14 wherein the constant pulse proportional current controller is a digital constant pulse proportional current controller wherein the open-loop correction signals are much faster than the bandwidth of the pulse width modulation control loop and may be inserted and not cancelled by the pulse width modulation control loop, effectively making them open loop correction signals.

16. A power factor correction system of claim 14 further comprises a digital constant pulse proportional controller circuit operating as one of a buck-boost converter and a fly back converter.

17. A power factor correction system of claim 14 wherein operation is in a voltage control mode.

18. A power factor correction system of claim 14 wherein operation is in a current control mode.

19. A system for improving the power factor to near unity between a low frequency AC power source and a complex load, the system comprising:

a bridge rectifier circuit operatively connected to the AC power source to convert an AC voltage into a low frequency fully rectified voltage signal;

one of a buck-boost and flyback converter unit operatively connected to the bridge rectifier to receive and convert the low frequency fully rectified signal into a DC voltage across the complex load;

a high frequency controller circuit operatively connected between a control input of the one of the buck-boost and flyback converter and a negative terminal of the output of the one of the buck-boost and flyback converter, wherein the high frequency controller circuit includes a pulse width modulation circuit to generate a control signal having trains of pulses, constant in frequency and duty cycle during a time period equal to or longer than one semi-cycle period of the AC power source signal to be applied to the control input of the one of the buck-boost and flyback converter so that the current amount absorbed by the one of the buck-boost and flyback converter from the AC power source is contingent and linearly proportional to the AC power source voltage signal wherein the pulse width modulation circuit includes a voltage ramp buffer sub-circuit to compare and amplify the control signal to a reference voltage.

20. A system of claim 19 where the one of the buck-boost and flyback converter comprises:

a capacitive circuit coupled across the output terminals of the rectifier bridge circuit to present a high impedance in respect to that of the AC power source low frequency supply signal and a low impedance in respect to that of the one of the buck-boost and flyback converter high frequency signal;

a high frequency rectifier diode coupled to the complex load, wherein the high frequency rectifier diode includes:

a power switch anode; and a cathode, wherein the cathode of the high frequency rectifier diode is coupled to a positive end of the complex load;

an oscillating inductor having:

a primary inductor winding coupled between a positive output terminal of the output terminals of the bridge rectifier circuit and the power switch anode of the high frequency rectifier diode, wherein the primary inductor defines a first charging time and a first discharging time;

a secondary inductor winding coupled between the anode of a high frequency rectifier diode and a ground terminal, wherein the secondary inductor winding defines a second charging time and a second discharging time; and a controllable power switch circuit coupled between the primary inductor winding and a sense resistor connected to a negative terminal of the output terminals of the bridge rectifier circuit for periodically charging the oscillating inductor and a control terminal of the controllable power switch circuit operatively disposed to receive the control signal.

21. A system of claim 19 when the one of the buck-boost and flyback converter is operating in voltage control mode a correction signal or plurality of signals is created from a fully rectified voltage from the bridge rectifier circuit or a DC voltage across the complex load, wherein steps of adjusting the duty cycle of the driving signal from the pulse width modulation circuit include altering a first voltage with a portion of a second voltage and proportionally altering the driving pulse duty cycle.

22. A method of power factor correction with a constant pulse proportional current mode of operation between an applied low frequency AC power signal and a complex load including a capacitor forming a DC output voltage, the method comprising:
rectifying the low frequency AC power signal having a peak voltage level to provide a fully rectified supply signal;
high frequency converting the fully rectified supply signal into the DC output voltage using a high frequency controllable boost converter;
applying the fully rectified supply signal to the capacitor of the complex load;
eliminating a direct current component of the fully rectified supply signal from the complex load to maintain a DC voltage component of the fully rectified supply signal across the complex load at a higher voltage level than the AC power signal peak voltage level;
controlling the high frequency converting step with driving pulse signals each generated at a period of a selected clock cycle from a constant pulse proportional current pulse width modulation controller consisting of:
a voltage ramp buffer sub-circuit comparing and amplifying the fully rectified supply signal generating a voltage ramp correction signal;
a voltage error amplifier sub-circuit coupled to the voltage ramp buffer sub-circuit receiving and amplifying the voltage ramp correction signal; and
an analog reset switching sub-circuit operatively connected to the voltage error amplifier sub-circuit and voltage ramp buffer sub-circuit for rapidly decreasing the amplified voltage ramp correction signal to near zero during each clock cycle wherein trains of pulses constant in frequency and duty cycle during a time equal to or longer than one semi-cycle period of the AC power signal so that the current absorbed from the AC power signal is contingent and linearly proportional to the AC power signal peak voltage level.

23. A method of claim 22 wherein the constant pulse proportional current pulse width modulation controller forms a control loop between the complex load and the boost converter, the steps comprised of:
applying the fully rectified signal as an open-loop control signal to the voltage ramp buffer sub-circuit of the pulse width modulation controller;
applying an output voltage from the complex load as an open-loop control signal to the voltage error amplifier sub-circuit for modifying the driving pulse signals of the pulse width modulation controller and compensating the control loop;
applying a sense voltage coupled from a sense resistor between a power switch of the boost converter and ground as an open-loop control signal to the voltage ramp buffer sub-circuit of the pulse width modulation controller providing a current limiting control loop;
summing open-loop control signals within the constant pulse proportional current pulse width modulation controller;
generating a train of pulses from the pulse width modulation controller constant in frequency and duty cycle during a time equal to or longer than one semi-cycle period of the AC power signal to drive the power switch.

24. A method of claim 22 wherein the constant pulse proportional current pulse width modulation controller is implemented with mixed signal circuits, analog circuits only or digital circuits only.

25. A system for improving the power factor to near unity between a low frequency AC power source and a complex load, the system comprising:
a bridge rectifier circuit having an input disposed to be operatively connected to the AC power source to convert an AC power source voltage signal therefrom into a low frequency fully rectified voltage signal at an output of the bridge rectifier circuit;
a boost converter unit having an input operatively connected to the output of the bridge rectifier circuit to receive and convert the low frequency fully rectified voltage signal into a DC voltage disposed to be applied across the complex load at an output of the boost converter; and
a high frequency controller circuit operatively connected between a control input of the boost converter and a negative terminal of the output of the boost converter includes a pulse width modulation circuit to generate a control signal having trains of pulses, constant in frequency and duty cycle during a time period equal to or longer than one semi-cycle period of the AC power source voltage signal to be provided to the control input of the boost converter so a current amount absorbed by the boost converter from the AC power source is contingent and linearly proportional to the AC power source voltage signal wherein the pulse width modulation circuit includes:
a fixed frequency oscillator sub-circuit to generate a set logic output, a reset logic output, a clock logic output, and a voltage ramp output signal as synchronizing signals;
a voltage error amplifier sub-circuit disposed to receive and amplify the control signal; and
a pulse width modulation logic sub-circuit having inputs from the fixed frequency oscillator and voltage error amplifier sub-circuits to generate a driving signal with a duty cycle contingent and proportional to the inputs.

26. A method of power factor correction with a constant pulse proportional current mode of operation between an applied low frequency AC power signal and a complex load including a capacitor forming a DC output voltage, the method comprising:
rectifying the low frequency AC power signal having a peak voltage level to provide a fully rectified supply signal and control signal;
high frequency converting the fully rectified supply signal into the DC output voltage using one of a high frequency controllable buck-boost converter and a flyback converter;

applying the fully rectified supply signal to the capacitor of the complex load;

eliminating a direct current component of the fully rectified supply signal from the complex load to maintain a DC voltage component of the fully rectified supply signal across the complex load;

controlling the high frequency converting step with driving pulse signals each generated at a period of a selected clock cycle from a constant pulse proportional current pulse width modulation controller consisting of:

a voltage ramp buffer sub-circuit comparing and amplifying the fully rectified supply signal generating a voltage ramp correction signal;

a voltage error amplifier sub-circuit coupled to the voltage ramp buffer sub-circuit receiving and amplifying the voltage ramp correction signal; and an analog reset switching sub-circuit operatively connected to the voltage error amplifier sub-circuit and voltage ramp buffer sub-circuit for rapidly decreasing the amplified voltage ramp correction signal to near zero during each clock cycle wherein trains of pulses constant in frequency and duty cycle during a time equal to or longer than one semi-cycle period of the AC power signal so the current absorbed from the AC power signal is contingent and linearly proportional to the AC power signal peak voltage level.

* * * * *